(12) United States Patent
Mori et al.

(10) Patent No.: US 8,000,558 B2
(45) Date of Patent: Aug. 16, 2011

(54) THUMBNAIL GENERATING APPARATUS AND IMAGE SHOOTING APPARATUS

(75) Inventors: Yukio Mori, Hirakata (JP); Yasuhachi Hamamoto, Moriguchi (JP); Seiji Okada, Hirakata (JP); Hiroaki Yoshida, Takatsuki (JP); Satoru Takeuchi, Shijonawate (JP); Masahiro Yokohata, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 905 days.

(21) Appl. No.: 11/723,603

(22) Filed: Mar. 21, 2007

(65) Prior Publication Data

US 2007/0222884 A1 Sep. 27, 2007

(30) Foreign Application Priority Data

Mar. 27, 2006 (JP) ................................. 2006-084882
Mar. 27, 2006 (JP) ................................. 2006-084967

(51) Int. Cl.
*G06K 9/64* (2006.01)
(52) U.S. Cl. ......... 382/276; 382/235; 382/243; 382/282
(58) Field of Classification Search .................. 382/235, 382/243, 278, 282
See application file for complete search history.

(56) References Cited

U.S. PATENT DOCUMENTS

| | | | |
|---|---|---|---|
| 6,307,550 B1 * | 10/2001 | Chen et al. ..................... 345/418 |
| 6,363,113 B1 * | 3/2002 | Faryar et al. ............. 375/240.03 |
| 6,728,476 B1 * | 4/2004 | Haseno .......................... 386/241 |
| 6,738,528 B1 * | 5/2004 | Nio et al. ....................... 382/268 |
| 6,819,796 B2 * | 11/2004 | Hong et al. .................... 382/173 |
| 6,847,391 B1 * | 1/2005 | Kassatly ..................... 348/14.01 |
| 6,850,252 B1 * | 2/2005 | Hoffberg ...................... 715/716 |
| 6,882,793 B1 * | 4/2005 | Fu et al. ......................... 386/241 |
| 6,919,892 B1 * | 7/2005 | Cheiky et al. ................. 345/473 |
| 6,925,245 B1 | 8/2005 | Miyatake et al. |
| 7,006,881 B1 * | 2/2006 | Hoffberg et al. ................. 700/83 |
| 7,154,535 B2 * | 12/2006 | Yamasaki et al. .......... 348/207.1 |
| 7,295,244 B2 * | 11/2007 | Manico et al. ................ 348/373 |
| 7,319,480 B2 * | 1/2008 | Akiyama et al. ........... 348/220.1 |
| 2004/0189824 A1 | 9/2004 | Shibutani |

FOREIGN PATENT DOCUMENTS

| | | |
|---|---|---|
| JP | H-10-28250 A | 1/1989 |
| JP | 08-251540 | 9/1996 |
| JP | 10-028250 | 1/1998 |
| JP | 2000-278641 | 6/2000 |

(Continued)

OTHER PUBLICATIONS

Notification of Reasons for Refusal issued by the JPO, dated Jul. 6, 2010; English translation included.
Notification of Grounds for Rejection issued by the JPO in Patent Application No. 2006-084882, dated Jul. 6, 2010; English translation included.

(Continued)

*Primary Examiner* — Yosef Kassa
(74) *Attorney, Agent, or Firm* — NDQ&M Watchstone LLP

(57) ABSTRACT

Based on, for example, the image at the start of a movie, a thumbnail image is tentatively generated and is stored in a header file. If a predetermined triggering condition is fulfilled during movie shooting, a thumbnail image is generated from the frame image at the timing that the triggering condition is fulfilled, and the thumbnail image existing in the header file is replaced with the newly generated thumbnail image. The triggering condition is fulfilled, for example, if, after zooming-in, the angle of view has been kept fixed for a predetermined period or longer, or if the focus has been kept locked for a predetermined period.

9 Claims, 18 Drawing Sheets

FOREIGN PATENT DOCUMENTS

| | | |
|---|---|---|
| JP | 2000-244849 A | 9/2000 |
| JP | 2000-350156 A | 12/2000 |
| JP | 2001-111963 | 4/2001 |
| JP | 2002-077803 | 3/2002 |
| JP | 2002-223412 | 8/2002 |
| JP | 2004-304642 A | 10/2004 |
| JP | 2004304642 | 10/2004 |
| JP | 2004-320646 A | 11/2004 |
| JP | 2005-109789 | 4/2005 |
| JP | 2005-229236 | 8/2005 |

OTHER PUBLICATIONS

Notification of Reasons for Refusal issued by the JPO in Patent Application No. 2006-084967, dated Aug. 24, 2010; English translation included.

Office Action issued on Jan. 25, 2011 in the corresponding Japanese Patent Application No. 2006-084967.

Decision of Rejection of Amendment and Decision of Rejection issued on Apr. 19, 2011 in the corresponding Japanese Patent Application No. 2006-084967.

* cited by examiner

FIG.8

| | |
|---|---|
| First Example | After zooming-in, the angle of view has been fixed for a period T1 or longer. |
| Second Example | Focus has been locked for a period T2 or longer. |
| Third Example | No motion has been observed for a period T3 or longer. |
| Fourth Example | The size of the detected face area is larger than or equal to a predetermined threshold value. |
| Fifth Example | The sound collected is the most intense throughout the shooting duration. |

| BL1 | BL2 | BL3 |
|-----|-----|-----|
| BL4 | BL5 | BL6 |
| BL7 | BL8 | BL9 |

- S151: DIVIDE DETECTION AREA INTO REGIONS
- S152: IDENTIFY LARGEST DIVIDED AREA
- S153: S151 AND S152 EXECUTED FOR ALL STILL IMAGES? No / Yes
- S154: SELECT STILL IMAGE CORRESPONDING TO LAGEST DIVIDED AREA WITH LARGEST AREA AS ADOPTED STILL IMAGE

|  | LUMINANCE SIGNAL VALUE | | |
|---|---|---|---|
| CLASS 1 | 0 | ~ | 30 |
| CLASS 2 | 31 | ~ | 60 |
| CLASS 3 | 61 | ~ | 90 |
| CLASS 4 | 91 | ~ | 120 |
| CLASS 5 | 121 | ~ | 150 |
| CLASS 6 | 151 | ~ | 180 |
| CLASS 7 | 181 | ~ | 210 |
| CLASS 8 | 211 | ~ | 240 |
| CLASS 9 | 241 | ~ | 255 |

THUMBNAIL GENERATING APPARATUS AND IMAGE SHOOTING APPARATUS

This nonprovisional application claims priority under 35 U.S.C. §119(a) on Patent Application No. 2006-084882 filed in Japan on Mar. 27, 2006 and Patent Application No. 2006-084967 filed in Japan on Mar. 27, 2006, the entire contents of both of which are hereby incorporated by reference.

BACKGROUND OF THE INVENTION

1. Field of the Invention

The present invention relates to a thumbnail generating apparatus for use in an image shooting apparatus such as a digital still camera or digital video camera. The invention also relates to an image shooting apparatus incorporating such a thumbnail generating apparatus.

2. Description of Related Art

Image shooting apparatuses such as digital video cameras typically have a mode in which they display thumbnail images. Thumbnail images of movies are generated at appropriate timing, for example at the start or end of their recording (hereinafter this method of thumbnail generation will be called conventional method 1). Image shooting apparatuses of this type are disclosed in, for example, JP-A-H10-028250, JP-A-2001-111963, JP-A-2005-229236, and JP-A-H8-251540. While viewing those thumbnail images, the user can select from a plurality of recorded movies the one he wants to play back. FIG. 14 is a flow chart showing the conventional method of thumbnail generation.

According to another conventionally proposed method (hereinafter called conventional method 2), at the end of recording of a movie (moving picture), the user is allowed to check through the movie to search for a frame of which the image he wants to select as a thumbnail image.

According to yet another conventionally proposed method (hereinafter called conventional method 3), an image shooting apparatus is provided with a switch dedicated for thumbnail generation so that, whenever it is pressed, a thumbnail image is generated from the image of the frame at that timing (see, e.g., JP-A-2002-077803)

On the other hand, there have also been proposed image shooting apparatuses capable of shooting still images while shooting a movie. This type of image shooting apparatus is typically capable of shooting and recording high-resolution still images while shooting a movie. This capability meets the demands of people who want, for example, to shoot the whole event of their kids running a race on a field day and meanwhile record the scenes at crucial moments, such as the runners reaching the finish line, in high-resolution still images.

If the user can make thumbnail images from impressive images, he can easily select among movies for playback. Inconveniently, however, with a method like conventional method 1 whereby thumbnail images are generated at appropriate timing, the thumbnail images often do not aptly represent the shot movies. This often makes it difficult to efficiently select the desired movie based on the thumbnail images.

Conventional method 2 imposes extra operation on the user. Conventional method 3 likewise imposes on the user extra operation of pressing the dedicated switch in the middle of recording, and in addition requires the provision of the dedicated switch.

SUMMARY OF THE INVENTION

According to a first aspect of the present invention, a thumbnail generating apparatus has the following features: based on a sensed-image signal representing a subject received from an image shooting portion provided in an image shooting apparatus capable of shooting a movie, the thumbnail generating apparatus generates a thumbnail image associated with the shot movie; the thumbnail generating apparatus includes a first generation portion generating, based on the sensed-image signal at prescribed timing, a first candidate thumbnail image as a candidate for the thumbnail image; and, when a predetermined triggering condition is fulfilled during shooting of the movie, based on the sensed-image signal at predetermined timing relative to when the triggering condition is fulfilled, the thumbnail generating apparatus generates a second candidate thumbnail image different from the first candidate thumbnail image and associates, as the thumbnail image, the second candidate thumbnail image with the movie.

Specifically, for example, the image shooting apparatus may include a view angle changing portion that allows the angle of view at which the image shooting portion performs shooting to be changed, and the triggering condition may include a condition that, after zooming-in is performed to decrease the angle of view, no change has been made in the angle of view by the view angle changing portion for a predetermined period or longer.

Specifically, for another example, the image shooting apparatus may include an autofocus control portion that automatically adjusts the position of the focus lens so that an optical image representing the subject is focused on the image sensing surface of an image sensing device, and the triggering condition may include a condition that the width of variation of the position has remained smaller than or equal to a predetermined threshold value for a predetermined period or longer.

Specifically, for another example, the image shooting apparatus may include a motion detecting portion that detects motion within a motion detection area in an image based on the sensed-image signal, the motion detection area being defined in a shot image included in the movie, and the triggering condition may include a condition that the magnitude of the detected motion has remained smaller than or equal to a predetermined threshold value for a predetermined period or longer.

Specifically, for another example, the image shooting apparatus may include a face area detection portion that detects a person's face area in a shot image included in the movie based on the sensed-image signal, and the triggering condition may include a condition that the size of the detected face area is larger than or equal to a predetermined threshold value.

Specifically, for another example, the image shooting apparatus may include a sound input portion that receives input of sound from the outside so that whether or not the triggering condition is fulfilled is checked based on the intensity or loudness of the sound inputted during shooting of the movie, and the second candidate thumbnail image may be generated from the sensed-image signal at predetermined timing relative to when the intensity or loudness of the sound, or the intensity or loudness of the frequency component of the sound in a predetermined band, is maximal during shooting of the movie.

Specifically, for another example, when the triggering condition is fulfilled during shooting of the movie, the second candidate thumbnail image may be generated from the sensed-image signal at the frame during which the triggering condition is fulfilled or at a frame close to that frame.

"A frame close to that frame" is, for example, the frame several frames before or after the frame during which the triggering condition is fulfilled; it may even be, for example, the frame several tens of frames before or after the frame during which the triggering condition is fulfilled.

Specifically, for another example, when the triggering condition is not fulfilled even once during shooting of the movie, the first candidate thumbnail image may be associated, as the thumbnail image, with the movie.

Specifically, for another example, the image shooting apparatus may be capable of shooting a still image during shooting of the movie, and the triggering condition may include a condition that an instruction to shoot the still image is entered.

According to a second aspect of the present invention, an image shooting apparatus capable of shooting a movie includes the image shooting portion mentioned above and the thumbnail generating apparatus according to the first aspect of the invention described above.

According to a third aspect of the present invention, a thumbnail generating apparatus has the following features: based on a sensed-image signal representing a subject received from an image shooting portion provided in an image shooting apparatus capable of shooting a still image during shooting of a movie, the thumbnail generating apparatus generates a thumbnail image associated with the shot movie; and, when a still image is shot during shooting of the movie, the thumbnail generating apparatus generates the thumbnail image from the sensed-image signal at predetermined timing relative to when the still image is shot.

Specifically, for example, the thumbnail image may be generated from the sensed-image signal representing the still image.

Specifically, for another example, the thumbnail generating apparatus may include a selection portion that, when a plurality of still images are shot during shooting of the movie, selects one of the still images as an adopted still image, and the thumbnail image may be generated from the sensed-image signal at predetermined timing relative to when the adopted still image is shot.

Specifically, for another example, which of the still images to select as the adopted still image may be prescribed.

Specifically, for another example, the thumbnail generating apparatus may include a contrast detection portion that defines a predetermined contrast detection area in each of the still images and that, based on the sensed-image signal representing the shot still images, detects the degree of contrast within the contrast detection area for each of the still images, and the selection portion may select the adopted still image based on the results of the comparison of the degree of contrast among the still images.

Specifically, for another example, the thumbnail generating apparatus may include an area division portion that defines a predetermined detection area in each of the still images and that, based on the sensed-image signal representing the shot still images, divides, in each of the still images, the detection area into a plurality of brightness regions or a plurality of color regions, and the selection portion may identify, in each of the still images, a brightness region or color region having the largest area among all the brightness regions or color regions, and select the adopted still image based on the results of the comparison of the area of the brightness region or color region having the largest area among the still images.

Specifically, for another example, the image shooting apparatus may include a sound input portion that receives input of sound from the outside, and the thumbnail generating apparatus may include a sound detection portion that detects, for each of the shot still images, the intensity or loudness of the sound, or intensity or loudness of the frequency component of the sound in a predetermined band, corresponding to the timing that the still image is shot so that the selection portion selects the adopted still image based on the results of the comparison of the intensity or loudness of the sound or the intensity or loudness of the frequency component of the sound in the predetermined band among the still images.

Specifically, for another example, when a plurality of still images are shot during shooting of the movie, part or all of the still images may be selected as adopted still images so that there are a plurality of adopted still images, and, for each of the adopted still images, a thumbnail element image may be generated from the sensed-image signal at predetermined timing relative to when the adopted still image is shot so that the thumbnail image is generated by synthesizing together thumbnail element images of the adopted still images.

According to a fourth aspect of the present invention, an image shooting apparatus capable of shooting a still image during shooting of a movie includes the image shooting portion mentioned above and the thumbnail generating apparatus according to the third aspect of the invention.

BRIEF DESCRIPTION OF THE DRAWINGS

FIG. 8 is a table listing examples of the triggering condition in step S11 shown in FIG. 7;

DETAILED DESCRIPTION OF PREFERRED EMBODIMENTS

Figure 1:
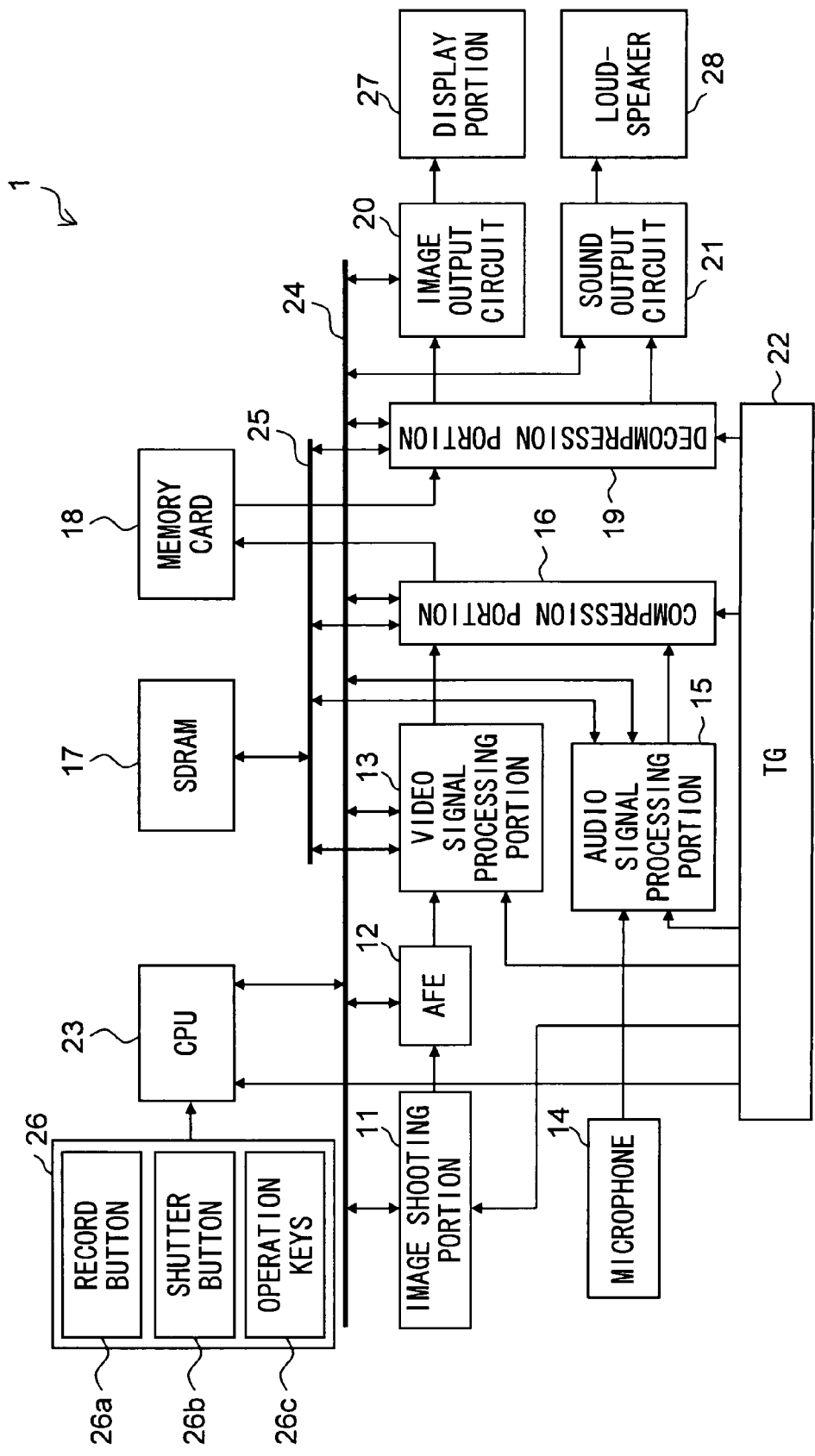
FIG. 1 is an overall block diagram of an image shooting apparatus according to a first embodiment of the invention.

Hereinafter, embodiments of the invention will be described by way of specific examples with reference to the accompanying drawings. In these drawings, the same parts that appear in more than one of them are identified with the same reference numerals.

First Embodiment

First, a first embodiment of the invention will be described. FIG. 1 is an overall block diagram of an image shooting apparatus 1 according to the first embodiment of the invention. The image shooting apparatus 1 is capable of shooting movies and still images, and is even capable of simultaneously shooting still images while shooting a movie.

The image shooting apparatus 1 includes an image shooting portion 11, an AFE (analog front end) 12, a video signal processing portion 13, a microphone (sound input portion) 14, an audio signal processing portion 15, a compression portion 16, an SDRAM (synchronous dynamic random-access memory) 17 as an example of an internal memory, a memory card 18, a decompression portion 19, an image output circuit (video output circuit) 20, a sound output circuit 21, a TG (timing generator) 22, a CPU (central processing unit) 23, a bus 24, a bus 25, an operated portion 26, a display portion 27, and a loudspeaker 28. The operated portion 26 includes a record button 26a, a shutter button 26b, operation keys 26c, etc.

Connected to the bus 24 are the image shooting portion 11, the AFE 12, the video signal processing portion 13, the audio signal processing portion 15, the compression portion 16, the decompression portion 19, the image output circuit 20, the sound output circuit 21, and the CPU 23. These blocks connected to the bus 24 exchange various signals (data) with one another via the bus 24.

Connected to the bus 25 are the video signal processing portion 13, the audio signal processing portion 15, the compression portion 16, the decompression portion 19, and the SDRAM 17. These blocks connected to the bus 25 exchange various signals (data) with one another via the bus 25.

The TG 22 generates timing control signals for controlling the timing of various operations of the image shooting apparatus 1 as a whole, and feeds those timing control signals to the relevant blocks in the image shooting apparatus 1. Specifically, the timing control signals are fed to the image shooting portion 11, the video signal processing portion 13, the audio signal processing portion 15, the compression portion 16, the decompression portion 19, and the CPU 23. The timing control signals include a vertical synchronizing (v-sync) signal Vsync and a horizontal synchronizing (h-sync) signal Hsync.

The CPU 23 controls the different blocks in the image shooting apparatus 1 in a centralized fashion. The operated portion 26 is operated by the user to receive instructions. The instructions received by the operated portion 26 are transmitted to the CPU 23. The SDRAM 17 functions as a frame memory. To the SDRAM 17, different blocks in the image shooting apparatus 1 record various kinds of data (digital signals) temporarily whenever necessary for signal processing. Such recording is achieved by an SDRAM controller (unillustrated) that controls writing and reading of data to and from the SDRAM 17.

The memory card 18 is an external recording medium, for example an SD (secure digital) memory card. The memory card 18 is removable from the image shooting apparatus 1. The contents of the memory card 18 can be freely read by an external personal computer or the like via the contacts on the memory card 18 or via a communication connector (unillustrated) provided in the image shooting apparatus 1. In this embodiment, a memory card 18 is taken up as an example of an external recording medium; in practice, it is possible to use any one or more recording media that allow random access, examples including a semiconductor memory, a memory card, an optical disk, and a magnetic disk.

Figure 2:
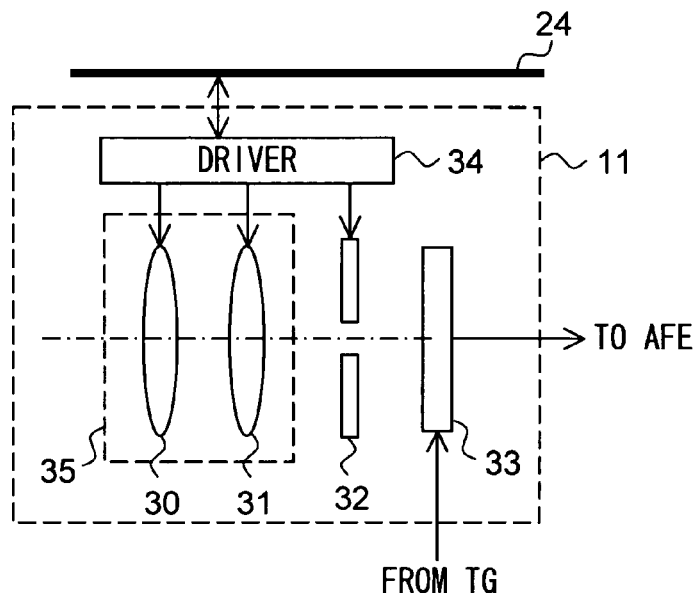
FIG. 2 is an internal block diagram of the image shooting portion shown in FIG. 1.

FIG. 2 is an internal configuration diagram of the image shooting portion 11 shown in FIG. 1. The image shooting portion 11 includes an optical system 35, an aperture stop 32, an image sensing device 33, and a driver 34. The optical system 35 includes a plurality of lenses including a zoom lens 30 and a focus lens 31. The driver 34 includes a motor for moving the zoom lens 30 and the focus lens 31 and for adjusting the aperture of aperture stop 32.

The light incoming from a subject (shooting object) passes through the zoom lens 30 and the focus lens 31 included in the optical system 35, and then passes through the aperture stop 32 to reach the image sensing device 33. The TG 22 generates driving pulses for driving the image sensing device 33 in synchronism with the previously mentioned timing control signals, and feeds those driving pulses to the image sensing device 33.

The image sensing device 33 is, for example, a CCD (charge-coupled device) or CMOS (complementary metal oxide semiconductor) image sensor. Through photoelectric conversion, the image sensing device 33 converts the optical image incoming through the optical system 35 and the aperture stop 32 into an electric signal, which the image sensing device 33 then feeds to the AFE 12. More specifically, the image sensing device 33 has a plurality of pixels (photoreceptive pixels, unillustrated) arrayed two-dimensionally in a matrix. During image sensing, each pixel stores electric charge whose amount is commensurate with the duration for which the pixel has been exposed to light. In synchronism with the driving pulses from the TG 22, an electric signal whose intensity is proportional to the amount of electric charge so stored is fed sequentially to the AFE 12.

The image sensing device 33 is a single-panel image sensing device capable of color image sensing. Each pixel of the image sensing device 33 is provided with a red (R), green (G), or blue (B) color filter (unillustrated). The image sensing device 33 may be a three-panel image sensing device.

The AFE 12 includes an amplifier circuit (unillustrated) and an A/D (analog-to-digital) conversion circuit (unillustrated). The amplifier circuit amplifies the output signal of the image shooting portion 11 (i.e., the output signal of the image sensing device 33), which is the above-mentioned electric signal, which is analog. The A/D conversion circuit converts the so amplified electric signal into a digital signal. Converted into a digital signal by the AFE 12, the output signal of the image shooting portion 11 is fed sequentially to the video signal processing portion 13. Based on the level of the output signal of the image shooting portion 11, the CPU 23 controls the amplification factor of the amplifier circuit.

In the following description, the signal outputted from the image shooting portion 11, and hence from the AFE 12, i.e., the signal representing the subject, is called the sensed-image signal.

Figure 3:
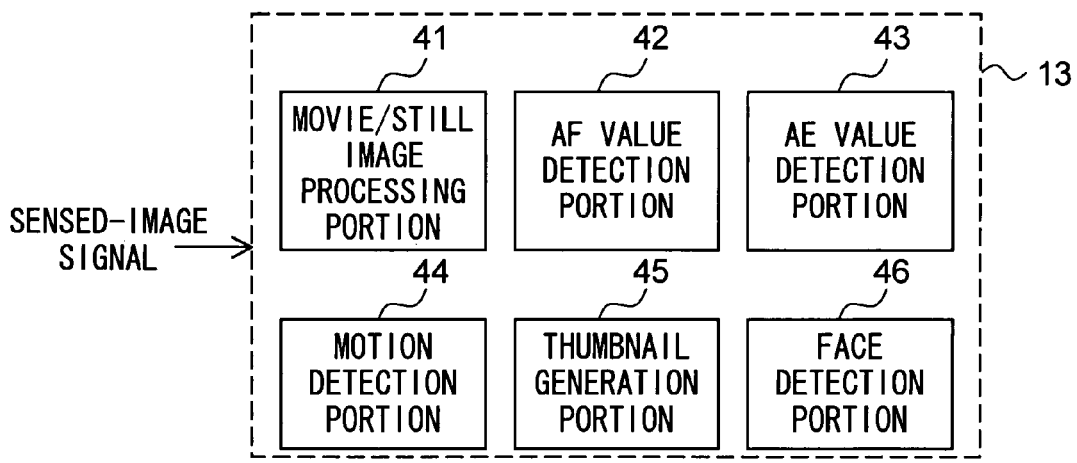
FIG. 3 is an internal block diagram of the video signal processing portion shown in FIG. 1.

FIG. 3 is an internal block diagram of the video signal processing portion 13. The video signal processing portion 13 includes a movie/still image processing portion 41, an AF value detection portion 42, an AE value detection portion 43, a motion detection portion 44, a thumbnail generation portion 45, and a face area detection portion 46.

Based on the sensed-image signal from the AFE 12, the movie/still image processing portion 41 generates a video signal representing the image (sensed image) obtained through image sensing by the image shooting portion 11, and then feeds the video signal to the compression portion 16. The video signal is composed of a luminance signal Y representing the brightness of the sensed image and color-difference signals U and V representing the color of the sensed image. The movie/still image processing portion 41 generates both a video signal of a movie and a video signal of a still image.

The microphone 14 converts sounds (voices) from around into an analog electric signal, and outputs the electric signal. The audio signal processing portion 15 converts the electric signal (analog audio signal) outputted from the microphone 14 into a digital signal. This digital signal is then fed, as an audio signal representing the sounds collected by the microphone 14, to the compression portion 16.

The compression portion 16 compresses the video signal from the video signal processing portion 13 (the movie/still image processing portion 41) by a predetermined compression method: it compresses movies by, for example, a compression method complying with the MPEG (Moving Picture Experts Group) standard, and compresses still images by, for example, a compression method complying with the JPEG (Joint Photographic Experts Group) standard. When a movie or still image is shot, its compressed video signal is fed to the memory card 18.

For example, wherever necessary, the size of the images constituting a movie, which are individually shot, is reduced, for example, through thinning-out by, for example, the movie/still image processing portion 41. For example, a still image is not subjected (but may be subjected) to such size reduction.

The compression portion 16 compresses the audio signal from the audio signal processing portion 15 by a predetermined compression method, such as one complying with the AAC (Advanced Audio Coding) standard. When a movie is shot, the video signal from the video signal processing portion 13 and the audio signal from the audio signal processing portion 15 are compressed by the compression portion 16, while they are temporally associated with each other, and are then fed to the memory card 18.

The record button 26a is a push-button switch that is operated by the user to enter an instruction to start or stop shooting of a movie (moving picture). The shutter button 26b is a push-button switch that is operated by the user to enter an instruction to shoot a still image (still picture). When the record button 26a is operated, a movie starts or stops being shot; when the shutter button 26b is operated, a still image is shot. For each frame, one frame image is acquired. The duration of each frame is, for example, 1/60 seconds. Thus, a series of frame images acquired at a cycle of 1/60 seconds (a stream image) constitutes a movie.

The image shooting apparatus 1 operates in different modes, including a shooting mode in which it can shoot movies and still images and a playback mode in which it plays back movies and still images stored in the memory card 18 on the display portion 27. The playback mode includes a thumbnail image display mode in which thumbnail images associated with the movies and still images stored in the memory card 18 are played back and displayed on the display portion 27. The different modes are switched as the operation keys 26c are operated.

In the shooting mode, when the user presses the record button 26a, under the control of the CPU 23, the video signal of the frames succeeding the press is, along with the corresponding audio signal, sequentially recorded to the memory card 18 via the compression portion 16. That is, along with the audio signal, the shot images of the frames (i.e., the frame images) are stored sequentially in the memory card 18. After the start of shooting of the movie, when the user presses the record button 26a again, the movie stops being shot. That is, the video signal and the audio signal stop being recorded to the memory card 18, and thus the shooting of the movie is completed.

On the other hand, in the shooting mode, when the user presses the shutter button 26b, a still image is shot. Specifically, under the control of the CPU 23, the video signal of one frame immediately after the press is recorded, as a video signal representing a still image, to the memory card 18 via the compression portion 16. A still image can be shot simultaneously while a movie is being shot. In this case, based on the sensed-image signal of the same frame, signal processing for the movie and that for the still image are performed concurrently. Alternatively, a single circuit may be shared on a time-division basis so as to perform signal processing for a movie and that for a still image at different timing. For example, signal processing for a still image is performed after shooting of a movie. In this case, for example, the sensed-image signal (shot image) needed for later signal processing is temporarily stored in the SDRAM 17.

In the playback mode, when the user operates the operation keys 26c in a predetermined way, the compressed video signal representing a movie or still image recorded in the memory card 18 is fed to the decompression portion 19. The decompression portion 19 decompresses the video signal and then feeds it to the image output circuit 20. Moreover, in the playback mode, generally, irrespective of whether or not a movie or still image is being shot, the video signal processing portion 13 continues generating a video signal, which is kept fed to the image output circuit 20.

The image output circuit 20 converts the video signal, fed to it in digital form, into a video signal in a format that can be displayed on the display portion 27 (e.g., an analog video signal) and then outputs it. The display portion 27 is a display device such as a liquid crystal display, and displays an image according to the video signal outputted from the image output circuit 20. That is, the display portion 27 displays an image based on the sensed-image signal currently being outputted from the image shooting portion 11 (the image representing the subject currently being shot) or a movie (moving picture) or still image (still picture) recorded in the memory card 18.

When a movie is played back in the playback mode, the corresponding compressed audio signal recorded in the memory card 18 is also fed to the decompression portion 19. The decompression portion 19 decompresses the audio signal and then feeds it to the sound output circuit 21. The sound output circuit 21 converts the audio signal, fed to it in digital form, into an audio signal in a format from which the loudspeaker 28 can play back (e.g., an analog audio signal) and then outputs it to the loudspeaker 28. The loudspeaker 28 reproduces sounds (voices) from the audio signal from the sound output circuit 21 and outputs the sounds to the outside.

The display portion 27 and the loudspeaker 28 may be thought of as being incorporated in an external television monitor or the like. In that case, the video signal outputted from the image output circuit 20 and the audio signal outputted from the sound output circuit 21 are fed to the external television monitor or the like via an unillustrated connector.

Next, with reference to FIGS. 2 and 3, the operation of the image shooting portion 11 and the video signal processing portion 13 will be described in more detail. The image shooting apparatus 1 is equipped with a so-called autofocus (automatic focusing) capability, whereby the position of the focus lens 31 is automatically controlled so that the optical image representing the subject is focused on the image sensing surface (light receiving surface) of the image sensing device 33. Ideally, this capability allows the points at which the optical image representing the subject is focused coincide with points on the image sensing surface of the image sensing device 33.

The autofocus capability can be realized by various methods. For example, a predetermined high-frequency component is extracted from the luminance signal contained in the video signal and, according to the level (intensity) of that high-frequency component, the position of the focus lens 31 is controlled so that the optical image representing the subject is focused on the image sensing surface of the image sensing device 33. The autofocus capability may be realized with a distance-measuring sensor (unillustrated) or the like.

Autofocus is achieved mainly by the AF value detection portion 42 shown in FIG. 3, the CPU 23 shown in FIG. 1, and the driver 34 shown in FIG. 2. Based on a focusing control signal that is fed from the CPU 23 to keep the level (intensity) of the above-mentioned high-frequency component at (close to) its maximum value, the driver 34 moves the focus lens 31 along the optical axis, which is perpendicular to the image sensing surface, so that the optical image of the subject (shooting object) is focused on the image sensing surface (light receiving surface) of the image sensing device 33.

Figure 4:
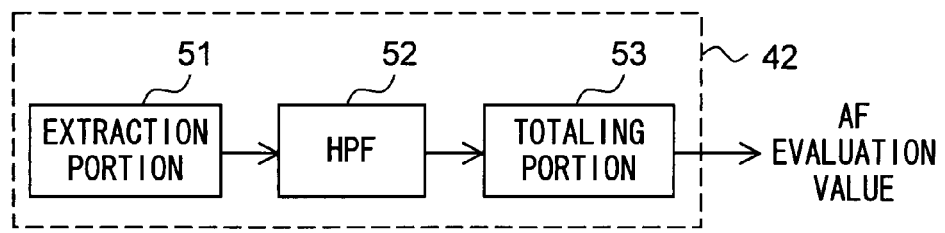
FIG. 4 is an internal block diagram of the AF value detection portion shown in FIG. 3.

FIG. 4 is an internal block diagram of the AF value detection portion 42. The AF value detection portion 42 includes an extraction portion 51, a HPF (high-pass filter) 52, and a totaling portion 53.

The extraction portion 51 extracts the luminance signal from the video signal generated by the movie/still image processing portion 41 or from the sensed-image signal from the AFE 12. Here, the luminance signal is extracted only from within a prescribed focus detection area in the image. The focus detection area is defined, for example, to cover a part of the image around its center. From the luminance signal extracted by the extraction portion 51, the HPF 52 extracts a predetermined high-frequency component.

The totaling portion 53 totalizes the high-frequency component extracted by the HPF 52 and thereby calculates an AF evaluation value commensurate with the degree of contrast within the focus detection area in the image. The AF evaluation value is calculated frame by frame and is fed sequentially to the CPU 23. The AF evaluation value is roughly proportional to the degree of contrast, the former increasing as the later increases.

The CPU 23 temporarily stores the AF evaluation value fed to it for one frame after another, and controls, via the driver 34, the position of the focus lens 31 by so-called hill-climbing calculation in such a way that the AF evaluation value remains at (close to) its maximum value. As the focus lens 31 is moved, the degree of contrast in the image varies, and accordingly the AF evaluation value varies. The CPU 23 controls, via the driver 34, the position of the focus lens 31 in that direction in which the AF evaluation value increases. As a result, as long as the optical image remains the same, the degree of contrast within the focus detection area is kept at (close to) its maximum value.

The image shooting apparatus 1 is also equipped with a so-called autoiris (automatic irising) capability, whereby the brightness of the shot image is kept (substantially) constant. Autoiris is realized mainly by the AE value detection portion 43 shown in FIG. 3, the CPU 23 shown in FIG. 1, and the driver 34 shown in FIG. 2.

The AE value detection portion 43 extracts the luminance signal from the video signal generated by the movie/still image processing portion 41 or from the sensed-image signal from the AFE 12. Here, the luminance signal is extracted, for example, from all over the image. The AE value detection portion 43 totalizes the extracted luminance signal for one entire image and thereby calculates an AE evaluation value proportional to the brightness of the image. The AE evaluation value is calculated frame by frame and is fed sequentially to the CPU 23.

The CPU 23 controls, via the driver 34, the aperture (how large is the opening) of the aperture stop 32 in such a way that the AE evaluation value fed to the CPU 23 for one frame after another remains at a constant value. As long as the optical image incoming through the optical system 35 remains the same, as the aperture of the aperture stop 32 increases, the amount of light incident on the image sensing device 33 per unit time increases, and accordingly the level (value) of the luminance signal increases. In a case where even with the aperture of the aperture stop 32 at its maximum the AE evaluation value is less than the above-mentioned constant value, the amplification factor of the amplifier circuit in the AFE 12 is so adjusted as to keep the AE evaluation value constant.

Moreover, when the operation keys 26c are operated in a predetermined way, the CPU 23 moves, via the driver 34, the zoom lens 30 along the optical axis so as to thereby vary the angle of view at which the image shooting portion 11 performs shooting (in other words, so as to thereby enlarge or reduce the image of the subject formed on the image sensing surface of the image sensing device 33).

The video signal processing portion 13 shown in FIG. 1 includes the motion detection portion 44 (see FIG. 3). Based on the sensed-image signal, the motion detection portion 44 detects the motion of the subject among the images of consecutive frames. This detection is achieved, for example, by the well-known representative point matching method. Based on the detected motion (e.g., represented by a vector), so-called camera shake correction is performed.

When a still image is shot, under the control of the CPU 23, the thumbnail generation portion 45 shown in FIG. 3 generates a thumbnail image of the still image based on the sensed-image signal at the timing that the still image is shot. This thumbnail image is a reduced image of a single still image (still picture) that has been shot and recorded, reduced, for example, through thinning-out. A thumbnail image of a shot still image is, with association established between them, compressed by the compression portion 16 (e.g., in compliance with the JPEG standard) and recorded to the memory card 18. A thumbnail image associated with a shot still image is called a still-image thumbnail (meaning "a thumbnail of a still image").

On the other hand, when a movie is shot, under the control of the CPU 23, the thumbnail generation portion 45 generates a thumbnail image of the movie based on the sensed-image signal at predetermined timing. This thumbnail image is a reduced image of the image (a one-frame-worth image) of one of the frames constituting the movie being shot, reduced, for example, through thinning-out. A thumbnail image of a shot movie is, (in principle) with association established between them, compressed by the compression portion 16 (e.g., in compliance with the JPEG standard) and recorded to the memory card 18. A thumbnail image generated to be recorded in association with a shot movie is called a movie thumbnail (meaning "a thumbnail of a movie"). In a case where the pixel size of a movie is comparatively small, the image of one of the frames constituting a shot movie may itself be used as a movie thumbnail.

A movie thumbnail may be generated at any timing. For example, a movie thumbnail may be generated by receiving the sensed-image signal from the AFE 12 during shooting of a movie is being shot. Instead, while a movie is being shot, an image from which to generate a movie thumbnail later may be selected so that from that image a movie thumbnail is generated afterwards (e.g., when one needs to be displayed on the display portion 27). Anyway, the sensed-image signal from which a given movie thumbnail is generated is the same. This embodiment deals with a case where, while a movie is being shot, a movie thumbnail is generated and stored in the memory card 18. Likewise, a still-image thumbnail may be generated at any timing.

In the thumbnail image display mode, movie thumbnails and still-image thumbnails stored in the memory card 18 are decompressed by the decompression portion 19 and then converted by the image output circuit 20 so as to be displayed on the display portion 27.

Figure 5:
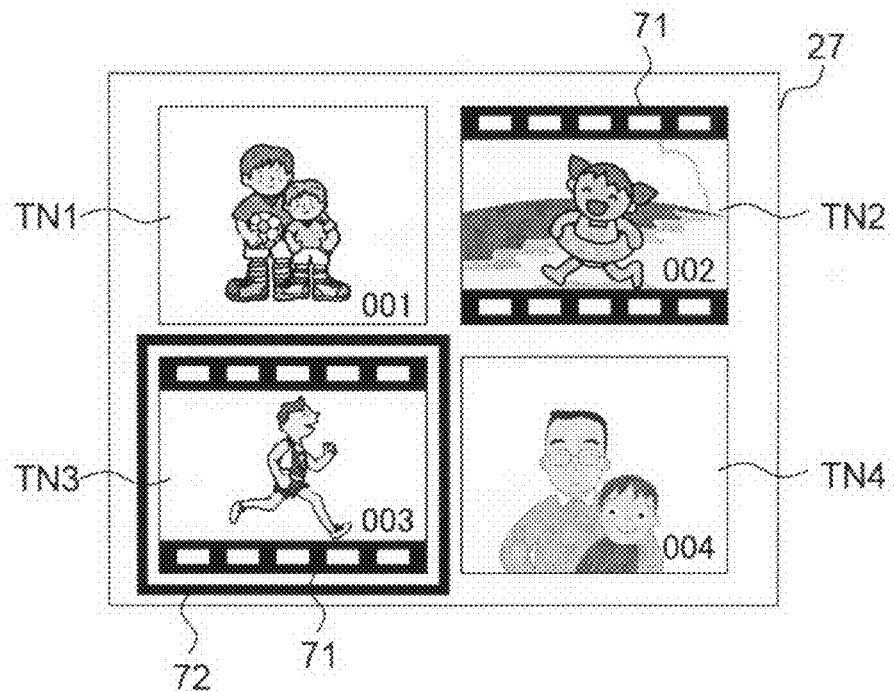
FIG. 5 is a diagram showing an example of the screen displayed on the display portion shown in FIG. 1 in a thumbnail image display mode.

FIG. 5 shows an example of the screen displayed on the display portion 27 in the thumbnail image display mode. In FIG. 5, the display area on the display portion 27 is divided into four parts, with thumbnail images TN1, TN2, TN3, and TN4 displayed in the upper left, upper right, lower left, and lower right parts of the display area respectively. If more thumbnail images are stored in the memory card 18, operating the operation keys 26c in a predetermined way makes them appear on the screen. The thumbnail images TN2 and TN3 bear a mark 71 indicating that they are movie thumbnails. Thus, the thumbnail images TN2 and TN3 are movie thumbnails, while the thumbnail images TN1 and TN4 are still-image thumbnails.

As shown in FIG. 5, a cursor 72 appears on the screen. The cursor 72 moves across the screen as the operation keys 26c are operated. FIG. 5 shows a state in which the thumbnail image TN3 is being selected by the cursor 72. The number, such as "001", appearing in a lower right part of each thumbnail image is its file number.

Figure 6:
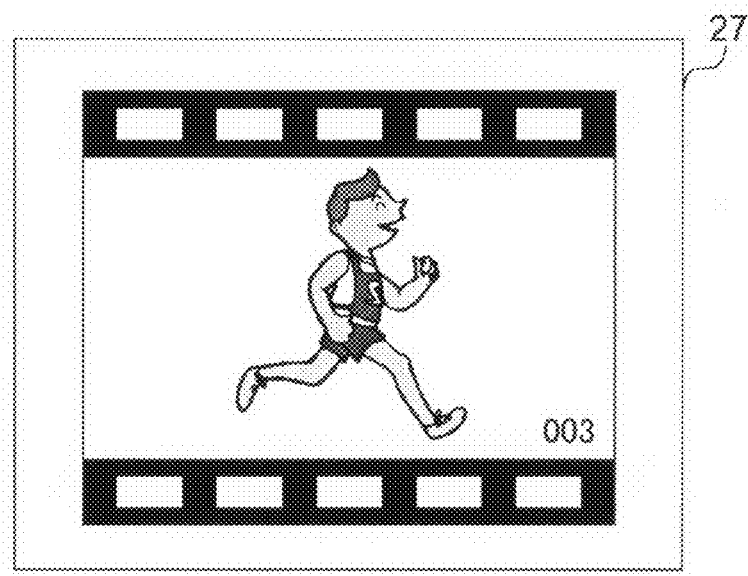
FIG. 6 is a diagram showing the screen for playing back a movie, to which screen the screen shown in FIG. 5 can be switched.

When a thumbnail image is being selected by the cursor 72, operating the keys in a predetermined way causes the movie or still image associated with that thumbnail image to be read from the memory card 18. The movie or still image is then displayed over the entire screen on the display portion 27. For example, when the keys are so operated as to start the playback of the movie corresponding to the thumbnail image TN3, the screen on the display portion 27 changes from FIG. 5 to FIG. 6, and the movie corresponding to the thumbnail image TN3 is played back over the entire screen on the display portion 27. In this state, when the keys are so operated as to stop the playback, the screen returns to FIG. 5.

Method for Generating a Movie Thumbnail

Figure 7:
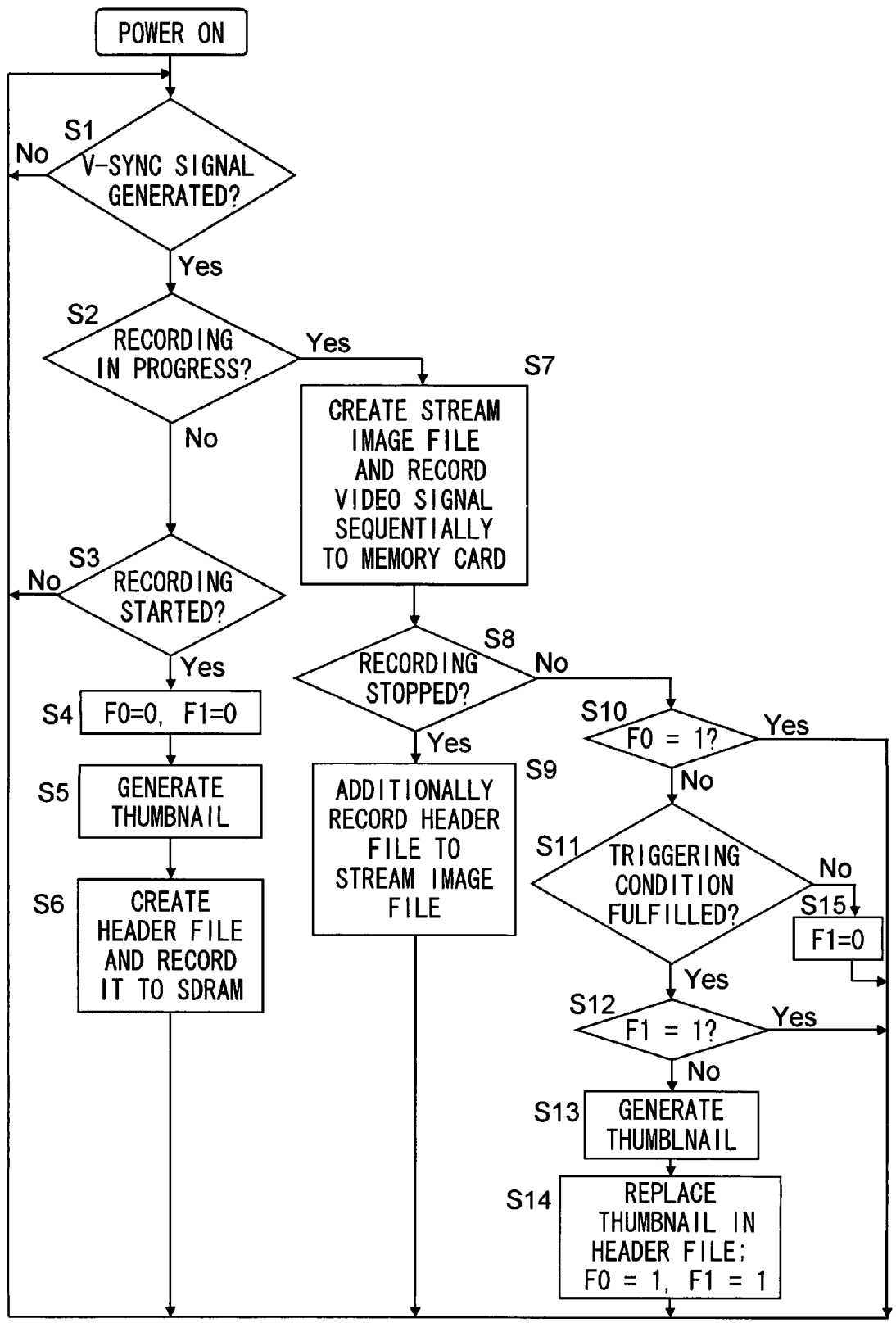
FIG. 7 is a flow chart showing the procedure for generating a movie thumbnail in the image shooting apparatus shown in FIG. 1.

Next, how a movie thumbnail is generated will be described. FIG. 7 is a flow chart showing the procedure for generating a movie thumbnail. Unless otherwise stated, the following description of this embodiment focuses on a given single movie.

When a power switch (unillustrated) provided in the image shooting apparatus 1 is operated so that electric power starts to be supplied to the different blocks in the image shooting apparatus 1, the TG 22 starts generating a vertical synchronizing (v-sync) signal at a predetermined cycle (e.g., 1/60 seconds). First, in step S1, whether or not the TG 22 has just outputted a vertical synchronizing signal is checked. The TG 22 outputs the vertical synchronizing signal at the start of every frame.

As long as no vertical synchronizing signal is found to have just been outputted ("No" in step S1), step S1 is repeated; if a vertical synchronizing signal is found to have just been outputted ("Yes" in step S1), then, in step S2, whether or not the image shooting apparatus 1 is recording (shooting a movie) is checked. If so ("Yes" in step S2), the procedure proceeds to step S7; if not ("No" in step S2), the procedure proceeds to step S3. In step S3, whether or not the record button 26a has been pressed in the shooting mode is checked. If so, ("Yes" in step S3), the procedure proceeds to step S4; if not ("No" in step S3), the procedure returns to step S1. In this way, before recording is started, the loop through steps S1, S2, and S3 is executed repeatedly.

In step S4, the CPU 23 defines two flags F0 and F1, each taking the value "0" or "1" at a time, and substitutes "0" in both of them (i.e., resets them). The flag F0 is reset every time recording is started. What the flag F1 serves for will be described later.

After step S4, in step S5, the thumbnail generation portion 45 generates a movie thumbnail based on the one-screen-worth sensed-image signal currently being outputted from the AFE 12. Subsequent to step S5, in step S6, the CPU 23 creates a header file. The header file contains, in addition to the movie thumbnail generated in step S5, various kinds of information such as the shooting date and time and the file number. The header file is then recorded to the SDRAM 17. This embodiment deals with a case where one header file contains one movie thumbnail.

After step S6, back in step S1, the generation of a vertical synchronizing signal is waited for again. When step S2 is reached through steps S4 to S6, the image shooting apparatus 1 is recording, and accordingly the procedure then proceeds to step S7 ("Yes" in step S2).

In step S7, the CPU 23 creates a stream image file in which to store the series of images representing the shot movie (i.e., a stream image), and records the stream image file to the memory card 18. To the stream image file is additionally recorded sequentially the video signal (compressed video signal) representing the images of the frames of the movie currently being shot, along with the corresponding audio signal (compressed audio signal). Eventually, at the end of recording, the stream image file contains the video signal representing the shot images of all the frames after the start until the end of recording along with the corresponding audio signal.

After step S7, in step S8, whether or not the user has pressed the record button 26a again is checked, that is, whether or not an instruction to stop recording has been entered is checked. If not ("No" in step S8), the procedure proceeds to step S10. Until an instruction to stop recording is entered, the loop through the sequence of steps S10 to S15 and through steps S1, S2, S7, and S8 is executed repeatedly. This loop is gone through once every frame.

If, in step S8, an instruction to stop recording is found to have been entered ("Yes" in step S8), the procedure proceeds to step S9, where the header file created in step S6 is additionally recorded to the stream image file created in step S7. This allows the two files to be associated with each other, and thus the movie thumbnail generated in step S5 and the movie contained in the stream image file are associated with each other, or (as will be described later) the movie thumbnail generated in step S13, which will be described later, and the movie contained in the stream image file are associated with each other. After step S9, the procedure returns to step S1, bringing the image shooting apparatus 1 back into the state in which it can accept an instruction to start shooting of a new movie.

Now, a description will be given of the operations performed in steps S10 to S15, which constitute the distinctive features of the invention.

In step S10, whether or not the flag F0 is set is checked, that is, whether or not the flag F0 is "1" is checked. If the flag F0 is "1" ("Yes" in step S10), the procedure returns to step S1; if the flag F0 is "0" ("No" in step S10), the procedure proceeds to step S11. During shooting of one movie, when steps S13 and S14 are gone through once, the check in step S10 always results in "Yes".

In step S11, the CPU 23 checks whether or not a predetermined triggering condition is fulfilled. What a triggering condition is will be described in detail later. If the flag F0 is "0", step S11 is executed for each frame during movie shooting. If the triggering condition is not fulfilled ("No" in step S11), the procedure proceeds to step S15, where "0" is substituted in the flag F1, and then returns to step S1. If the triggering condition is fulfilled ("Yes" in step S11), the procedure proceeds to step S12, where whether or not the flag F1 is "1" is checked. If the flag F1 is "1" ("Yes" in step S12), the procedure returns to step S1; if the flag F1 is "0" ("No" in step S12), the procedure proceeds to step S13.

In step S13, based on the one-screen-worth sensed-image signal currently being outputted from the AFE 12, a movie thumbnail is generated. Thus, based on the sensed-image signal (sensed image) of the frame whose duration includes the timing at which the triggering condition is fulfilled in step S11, or of the immediately succeeding frame, a movie thumbnail is generated. A movie thumbnail to be generated in step S13 may instead be generated based on the sensed-image signal (sensed image) of the frame several frames before or after the triggering condition is fulfilled.

After step S13, in step S14, the movie thumbnail existing in the header file created in step S6 is replaced with the movie thumbnail generated in step S13; moreover, "1" is substituted in both the flags F0 and F1. The procedure then returns to step S1.

Step S10 may be omitted. In that case, if, in step S8, no instruction to stop recording is found to have been entered ("No" in step S8), the procedure proceeds directly to step S11. In a case where step S10 is omitted, even after steps S13 and S14 are executed, the triggering condition is not fulfilled, and thus step S15 is gone through; hence, steps S13 and S14 are allowed to be executed again. In this case, every time step S14 is executed for the second or any subsequent time, the movie thumbnail existing in the header file is replaced with the "latest" movie thumbnail generated in step S13.

As will be understood from the procedure described above, the movie thumbnails generated in steps S5 and S13 become candidates for the movie thumbnail to be associated with a shot movie. If the triggering condition is not fulfilled even once during shooting of a movie, the movie thumbnail generated in step S5 eventually becomes the movie thumbnail associated with the movie.

If, in step S11, the triggering condition is fulfilled, the movie thumbnail generated in step S13 eventually becomes associated with the shot movie. In a case where step S10 is omitted, the latest movie thumbnail generated in step S13 eventually becomes associated with the shot movie.

The above-mentioned triggering condition is so defined that the movie thumbnail generated in step S13 aptly represents the shot movie. Now, different methods for checking whether or not a triggering condition is fulfilled in step S11 will be described below as a first to a fifth check method. FIG. 8 shows typical examples of different triggering conditions, corresponding to the first to fifth check methods respectively.

First Check Method: First, the first check method will be described. The triggering condition whose fulfillment is checked in step S11 when the first check method is adopted will be called the first trigger condition. If the first triggering condition is fulfilled, the procedure proceeds to step S12; if not, the procedure proceeds to step S15.

In a case where the first check method is adopted, in step S11, for example, whether or not "no change in angle of view has been made by zooming-in or zooming-out (i.e. the angle of view has been fixed) for a predetermined period T1 or longer after immediately previous zooming-in" is checked as a check of whether or not the first triggering condition is fulfilled. This check is made with respect to the current moment (current frame). The period T1 is, for example, a few seconds (e.g., one to two seconds).

Figure 9:
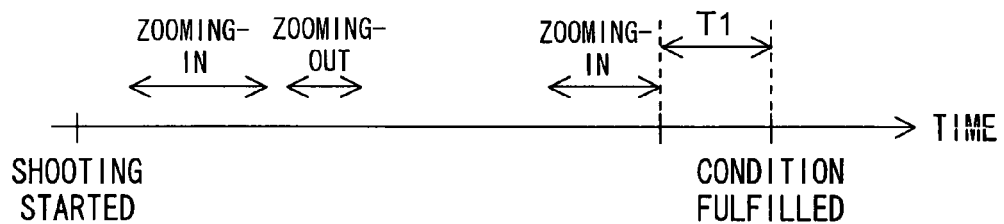
FIG. 9 is a diagram illustrating a first check method for checking whether or not the triggering condition is fulfilled in step S11 shown in FIG. 7.

For example, suppose that, as shown in FIG. 9, after a movie starts to be shot, zooming-in is performed for the first time, and then immediately thereafter, specifically before a period T1 passes thereafter, zooming-out is performed; then, further afterwards, zooming-in is performed for the second time. In this case, whether or not a period T1 has passed is checked with respect to the end of the second-time zooming-in (the immediately previous zooming-in).

Zooming-in is the operation whereby the image of the subject formed on the image sensing surface of the image sensing device 33 is enlarged; as zooming-in is performed, the angle of view at which the image shooting portion 11 performs shooting decreases. Zooming-out is the operation whereby the image of the subject formed on the image sensing surface of the image sensing device 33 is reduced; as zooming-out is performed, the angle of view at which the image shooting portion 11 performs shooting increases.

Zooming-in and zooming-out are performed when the operation keys 26c are operated in predetermined ways.

The user often enlarges the subject he is aiming at, for example a person, by zooming in on it. As soon as the user knows he has zoomed in to an adequate angle of view, he stops changing the angle of view. An image shot in this state is likely to be a representative one in which the subject being aimed at appears large enough. Thus, adopting the first check method helps obtain thumbnail images that aptly represent movies, and thus helps facilitate retrieval of the desired movie.

The first triggering condition may be modified to whether or not "no change in angle of view has been made by zooming-in or zooming-out (i.e. the angle of view has been fixed) for a predetermined period T1 or longer after immediately previous zooming-out".

Second Check Method: Next, the second check method will be described. The triggering condition whose fulfillment is checked in step S11 when the second check method is adopted will be called the second trigger condition. If the second triggering condition is fulfilled, the procedure proceeds to step S12; if not, the procedure proceeds to step S15.

In a case where the second check method is adopted, in step S11, whether or not "the focus, once achieved, have been kept (substantially) locked for a predetermined period or longer" is checked. More specifically, in step S11, for example, whether or not "the width of variation of the position of the focus lens 31 has remained smaller than or equal to a predetermined threshold value for a predetermined period T2 or longer" is checked as a check of whether or not the second triggering condition is fulfilled. This check is made with respect to the current moment (current frame). The period T2 is, for example, a few seconds (e.g., one to two seconds).

As described earlier, based on the AF evaluation value calculated frame by frame, the CPU 23 controls, via the driver 34, the position of the focus lens 31 in such a way that the optical image representing the subject is focused on the image sensing surface (light receiving surface) of the image sensing device 33. Thus, naturally, the CPU 23 knows the position of the focus lens 31. The position of the focus lens 31 is, for example, its position with respect to the image sensing surface of the image sensing device 33.

Figure 10:
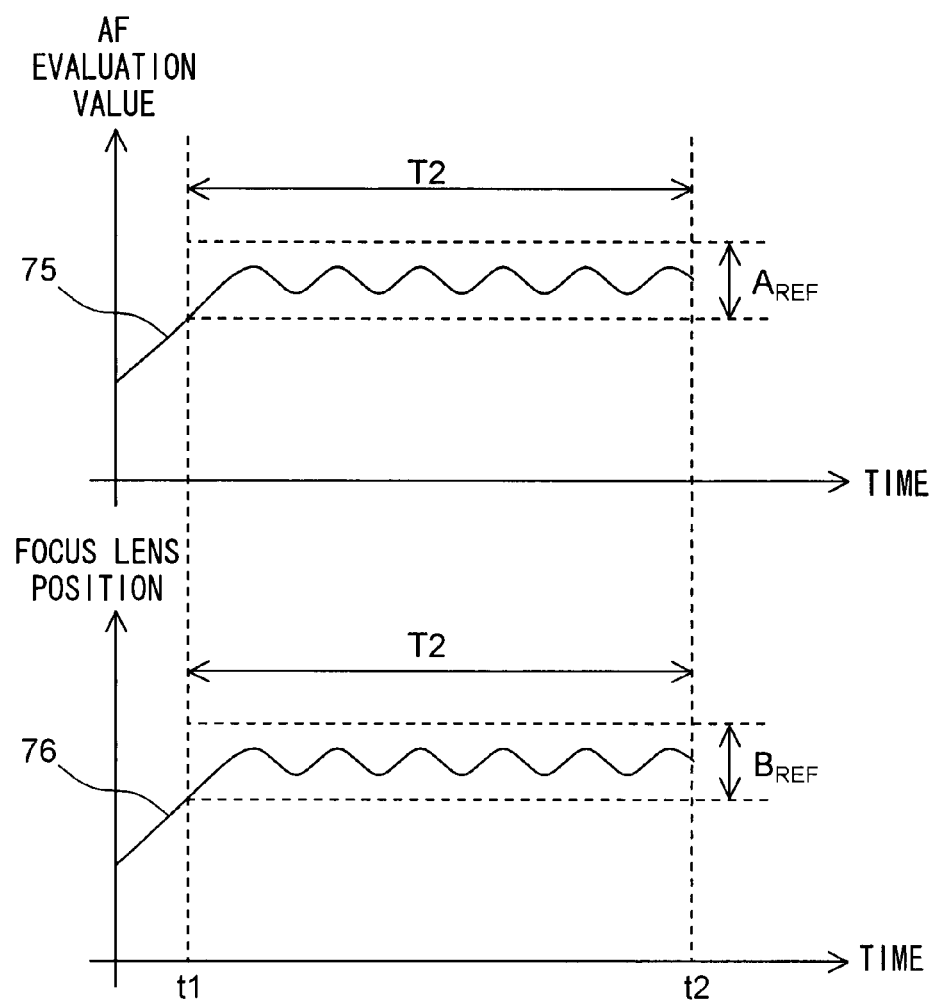
FIG. 10 is a diagram illustrating a second check method for checking whether or not the triggering condition is fulfilled in step S11 shown in FIG. 7.

Now, with reference to FIG. 10, an example of how to check whether or not the second triggering condition is fulfilled will be described in detail. In FIG. 10, curves 75 and 76 represent the temporal variation of the AF evaluation value and of the position of the focus lens 31 (e.g., the distance from the focus lens 31 to the image sensing surface), respectively, during shooting of a movie. In FIG. 10, at time t1, the AF evaluation value becomes roughly equal to the maximum value of a hill-climbing curve; thereafter, the AF evaluation value remains there until time t2. The period between times t1 and t2 equals T2.

At time t2, the CPU 23 compares the width of variation of the position of the focus lens 31 (the width across which it has been varying) during the period between times t1 and t2 with a prescribed reference value $B_{REF}$. If the former is smaller than or equal to the latter ($B_{REF}$), the second triggering condition is judged to be fulfilled; otherwise, the second triggering condition is judged to be not fulfilled. To enable this judgment, the CPU 23 keeps, in the SDRAM 17, frame-by-frame information on the position of the focus lens 31 for the past period equal to T2.

In a case where the focus lens 31 can be kept at a completely fixed position when it is focused, the reference value $B_{REF}$ may be set equal to zero. In that case, the second triggering condition is whether or not "the position of the focus lens 31 has remained fixed for a predetermined period T2 or longer". The position of the focus lens 31 may be so controlled as to be kept fixed as long as the AF evaluation value varies within a certain width (which equals, for example, a reference value $A_{REF}$, which will be described later). In that case, the reference value $B_{REF}$ is set equal to zero.

As shown in FIG. 10, the AF evaluation value and the position of the focus lens 31 vary in a coordinated fashion. Thus, the check in step S11 may be made based on the AF evaluation value. Specifically, for example, at time t2, the CPU 23 compares the width of variation of the AF evaluation value (the width across which it has been varying) during the period between times t1 and t2 with a prescribed reference value $A_{REF}$. If the former is smaller than or equal to the latter ($A_{REF}$), the procedure proceeds from step S11 to step S12; otherwise, the procedure proceeds from step S11 to step S15. In that case, to enable such judgment, the CPU 23 keeps, in the SDRAM 17, the frame-by-frame AF evaluation value for the past period equal to T2.

In this way, the triggering condition whose fulfillment is checked in step S11 may be whether or not "the width of variation of the AF evaluation value has remained smaller than or equal to a predetermined reference value $A_{REF}$ for a predetermined period T2 or longer". Considering that the AF evaluation value and the position of the focus lens 31 vary in a coordinated fashion, this triggering condition is equivalent to the second triggering condition.

After starting to shoot a movie, the user tends to move the image shooting apparatus 1 around while paying attention to the composition of the movie being shot. Once a satisfactory composition is obtained, the user holds the image shooting apparatus 1 in a position (substantially) fixed relative to the subject. In this state, usually the focus is locked so that the image shooting apparatus 1 captures the subject the user is aiming at. Thus, adopting the second check method helps obtain thumbnail images that aptly represent movies, and thus helps facilitate retrieval of the desired movie.

Third Check Method: Next, the third check method will be described. The triggering condition whose fulfillment is checked in step S11 when the third check method is adopted will be called the third trigger condition. If the third triggering condition is fulfilled, the procedure proceeds to step S12; if not, the procedure proceeds to step S15.

In a case where the third check method is adopted, in step S11, whether or not what appeared in the shot images has remained (substantially) motionless for a predetermined period or longer is checked. More specifically, in step S11, for example, whether or not "the magnitude of motion within the motion detection area has remained smaller than or equal to a predetermined threshold value for a predetermined period T3 or longer" is checked as a check of whether or not the third triggering condition is fulfilled. This check is made with respect to the current moment (current frame). The motion detection area is defined in the shot image of each frame constituting a movie, so as to cover the whole or a part of the shot image (it may be thought of as an area covering the whole or a part of the image-sensing area of the image sensing device 33). The period T3 is, for example, a few seconds (e.g., one to two seconds).

Figures 11, 12:
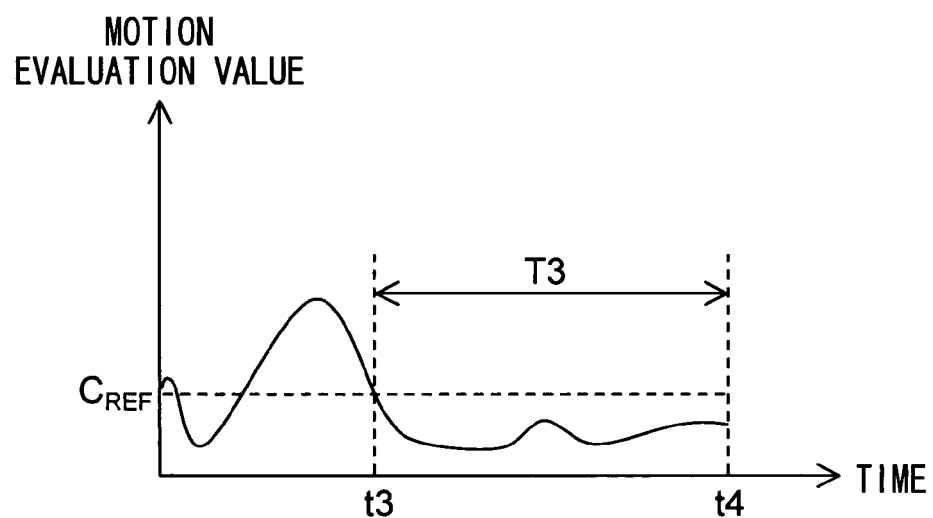
FIG. 11 is a diagram illustrating a third check method for checking whether or not the triggering condition is fulfilled in step S11 shown in FIG. 7.
FIG. 12 is a diagram illustrating a third check method for checking whether or not the triggering condition is fulfilled in step S11 shown in FIG. 7.

Now, with reference to FIG. 11, an example of how to check whether or not the third triggering condition is fulfilled will be described in detail. FIG. 11 shows detection blocks defined in a shot image by the motion detection portion 44 shown in FIG. 3. The motion detection portion 44 defines nine detection blocks BL1 to BL9 in the shot image of each frame. Together the nine detection blocks BL1 to BL9 form the above-mentioned "motion detection area".

Through comparison among shot images acquired one after another, the motion detection portion 44 detects a motion vector in each of the detection blocks BL1 to BL9 by the well-known representative point matching method. This detection of motion vectors is performed frame by frame. The motion vector in the detection block BL1 represents the motion within the detection block BL1 in the image; likewise, the motion vectors in the other detection blocks BL2 to BL9 respectively represent the motion there. The motion vectors detected in the detection blocks BL1 to BL9 are called the motion vectors VC1 to VC9 respectively.

Based on a motion evaluation value based on the magnitudes of the motion vectors VC1 to VC9 detected frame by frame, the CPU 23 checks whether or not the third triggering condition is fulfilled. The motion evaluation value is calculated frame by frame. The motion evaluation value is, for example, the average value or the totalized value of the magnitudes of the motion vectors VC1 to VC9. The magnitudes of the motion vectors VC1 to VC9 may themselves be used as motion evaluation values. In that case, for each frame, nine motion evaluation values are obtained.

In FIG. 12, a curve 77 represents the temporal variation of the motion evaluation value during shooting of a movie. Suppose that, at time t3, the motion evaluation value, which has been greater than a predetermined reference value $C_{REF}$ up to that point, becomes smaller than or equal to the reference value $C_{REF}$, and thereafter continuously remains so until time t4. The period between times t3 and t4 equals T3.

At time t4, the CPU 23 compares every motion evaluation value during the period between times t3 and t4 with the reference value $C_{REF}$. If the former has continuously remained smaller than or equal to the latter ($C_{REF}$), the third triggering condition is judged to be fulfilled; otherwise, the third triggering condition is judged to be not fulfilled. To enable this judgment, the CPU 23 keeps, in the SDRAM 17, the frame-by-frame motion evaluation value for the past period equal to T3.

As will be understood from the foregoing, the third triggering condition is, put otherwise, whether or not "a motion evaluation value based on the magnitude of motion within the motion detection area in a movie has continuously remained smaller than or equal to a predetermined threshold value for a predetermined period T3 or longer".

A condition where no motion is observed among the shot images of a movie for a certain period or longer is supposed to correspond to a condition where a subject being aimed at, such as a person, is being captured in a stationary state. Thus, adopting the third check method helps obtain thumbnail images that aptly represent movies, and thus helps facilitate retrieval of the desired movie.

In a case where the image shooting apparatus 1 is held in the hands, so-called camera shake causes the subject in the image to move slightly. To avoid complete unfulfillment of the third triggering condition due to hand shake, the above-mentioned threshold value is set adequately through experiments or the like using an actual image shooting apparatus.

The detection of (the magnitude of) motion in the motion detection area can be achieved by various methods other than the representative point matching method specifically mentioned above.

For example, as is well known, the brightness (luminance signal) may be compared among the frames constituting a movie, detection block by detection block, so that, based on how the brightness varies in each detection block, (the magnitude of) motion within the motion detection area is detected. For another example, as is well known, the color (which is identified based on the video signal) may be compared among the frames constituting a movie, detection block by detection block, so that, based on how the color varies in each detection block, (the magnitude of) motion within the motion detection area is detected.

Fourth Check Method: Next, the fourth check method will be described. The triggering condition whose fulfillment is checked in step S11 when the fourth check method is adopted will be called the fourth trigger condition. If the fourth triggering condition is fulfilled, the procedure proceeds to step S12; if not, the procedure proceeds to step S15.

The fourth check method utilizes a face area detection capability, that is, a capability of detecting the area of a person's face appearing in the shot image of each frame. To achieve face area detection, the face area detection portion 46 is included in the video signal processing portion 13 (see FIG. 3). In a case where the fourth check method is adopted, in step S11, for example, whether or not "the size of the detected face area is larger than or equal to a predetermined threshold (reference size)" is checked as a check of whether or not the fourth check method is fulfilled.

Face area detection can be achieved by various methods. For example, the face area detection portion 46 recognizes the size of a face area by extracting a flesh-colored area from a shot image, as is well known. Specifically, for example, the face area detection portion 46 extracts from the shot images of the frames constituting a movie an area, called a face area, having a video signal classified as representing a flesh color, and then, based on the size (e.g., the area) of that area, calculates (detects) the size of the face area. Here, the extraction of a relevant area and the detection of the size of a face area are performed frame by frame. What video signal to classify as representing a flesh color is prescribed.

The size of a face area may also be detected by pattern matching, as is well known. In that case, information on various patterns of face areas is previously stored in a memory in the image shooting apparatus 1, and those patterns are compared with a shot image to detect a face area and its size.

In practice, for example, the face area detection portion 46 calculates a face area value commensurate with the size of a face area frame by frame and transmits it sequentially to the CPU 23. If the CPU 23 receives a face area value larger than or equal to a predetermined threshold value, it judges the fourth triggering condition to be fulfilled; otherwise, the CPU 23 judges the fourth triggering condition to be not fulfilled. The face area value increases as the size of the detected face area increases.

A condition where a face appears comparatively large in an image is supposed to correspond to a condition where the face of a person being aimed at by the user appears large. Thus, adopting the fourth check method helps obtain thumbnail images that aptly represent movies, and thus helps facilitate retrieval of the desired movie.

An upper limit may be set on the size of the face area, or the face area value, that fulfills the fourth triggering condition. Specifically, in that case, "if the size of the detected face area or the face area value is larger than or equal to a first threshold value but smaller than or equal to a second threshold value", in other words "if the size of the detected face area or the face area value is within a predetermined range", the procedure proceeds to step S12, and otherwise it proceeds to step S15. Here, the second threshold value is greater than the first threshold value.

If a thumbnail image is generated based on an image in which a face occupies an extremely large part of it, the thumbnail image represents a movie rather inaptly. It is out of this consideration that an upper limit may be set as mentioned above.

Fifth Check Method: Next, the fifth check method will be described. The triggering condition whose fulfillment is checked in step S11 when the fifth check method is adopted will be called the fifth trigger condition. If the fifth triggering condition is fulfilled, the procedure proceeds to step S12; if not, the procedure proceeds to step S15. When the fifth check method is adopted, step S110 is omitted.

The fifth check method pays attention to the intensity of the sound collected by the microphone 14 during movie shooting. The audio signal processing portion 15 is capable of sequentially monitoring the intensity of the sound, or the intensity of its frequency component in a predetermined band, collected by the microphone 14 during movie shooting. The detected intensity of sound, or of its frequency component in a predetermined band, is fed, as a sound intensity value, sequentially to the CPU 23.

Instead of the intensity of sound, the loudness of sound may be detected so that a value commensurate with the detected loudness of sound, or of its frequency component in a predetermined band, is used as a sound intensity value. In that case, in the following description, the expressions "intensity of sound" and "intensity of frequency component of sound in a predetermined band" are to be read as "loudness of sound" and "loudness of frequency component of sound in a predetermined band".

The sound intensity value is, for example, the average value, or the peak value, of the intensity of sound as detected throughout a frame. The sound intensity value may instead be, for example, the average value, or the peak value, of the intensity of frequency component of sound in a predetermined band as detected throughout a frame. Thus, the sound intensity value is obtained frame by frame. The sound intensity value increases as the intensity of sound increases. The above-mentioned frequency component in a predetermined band is, for example, that in the frequency band of human voice or in the audible frequency band. To extract a frequency component in such a predetermined band from the audio signal fed from the microphone 14, the audio signal processing portion 15 uses a band-pass filter or the like.

The CPU 23 checks whether or not the sound intensity value of the current frame is the greatest among those of all the frames since the movie started to be shot. If the sound intensity value of the current frame is the greatest, the fifth triggering condition is judged to be fulfilled; otherwise, the fifth triggering condition is judged to be not fulfilled.

When a movie is being shot on the occasion of a concert or party, a condition where the intensity of sounds is high is supposed to correspond to a condition where the atmosphere is livened up. Thus, adopting the fifth check method helps obtain thumbnail images that aptly represent movies, and thus helps facilitate retrieval of the desired movie.

Figure 13:
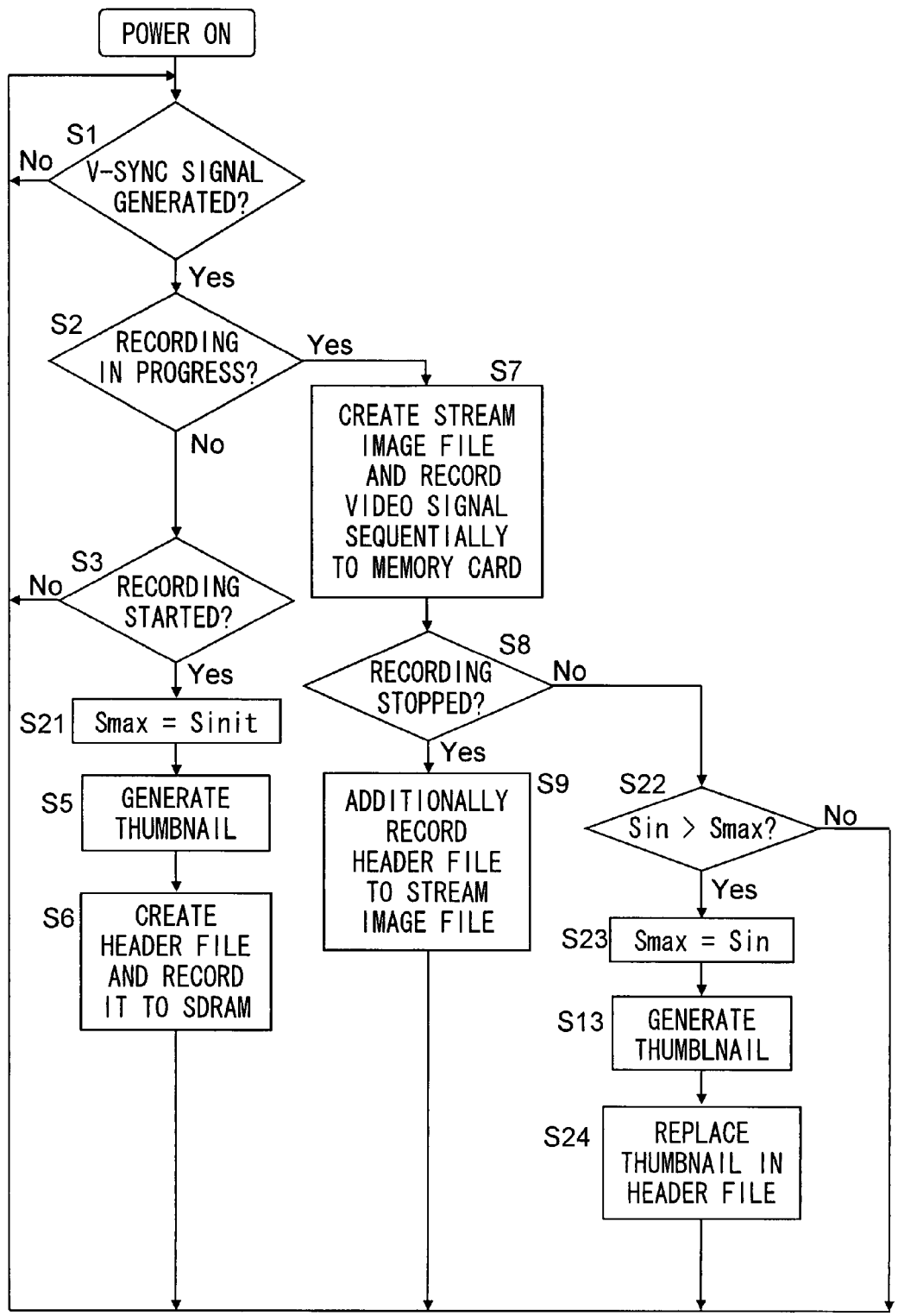
FIG. 13 is a diagram illustrating a fifth check method for checking whether or not the triggering condition is fulfilled in step S11 shown in FIG. 7.
Figure 14:
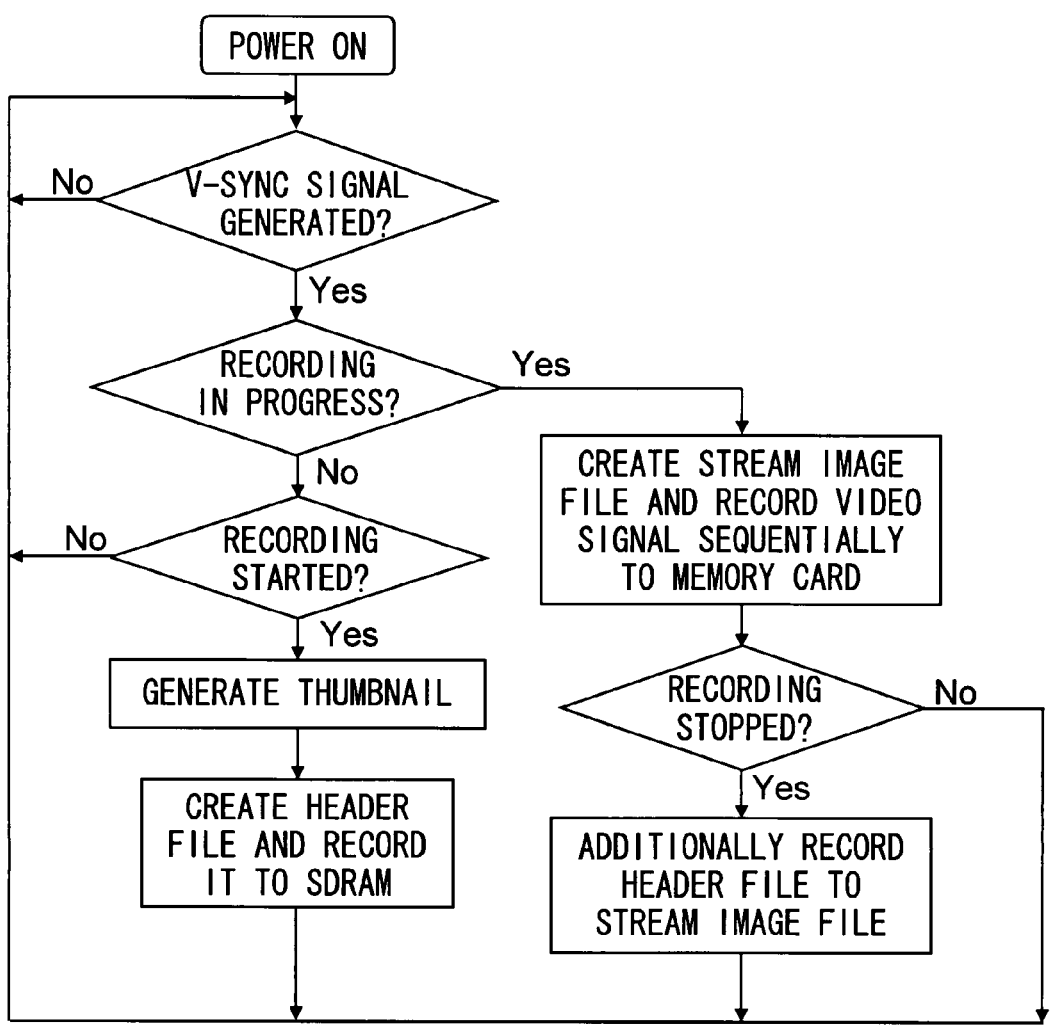
FIG. 14 is a flow chart showing the procedure for generating a movie thumbnail in a conventional image shooting apparatus.

In a case where the fifth check method is adopted, instead of the procedure for generating a movie thumbnail shown in the flow chart of FIG. 7, the procedure for generating a movie thumbnail shown in the flow chart of FIG. 13 may be adopted.

The procedure shown in FIG. 13 will now be described. Between FIGS. 7 and 13, the operations performed in the steps with the same step numbers are the same. Specifically, the operations performed in steps S1 to S3, S5 to S9, and S13 in FIG. 13 is the same as the operations performed in the steps with the same step numbers in FIG. 7. In the procedure shown in FIG. 13, step S21 replaces step S4 in FIG. 7, steps S22 and S23 replace steps S10 to S12 and S15 in FIG. 7, and step S24 replaces step S14 in FIG. 7.

In step S3, if the record button 26a is found to be pressed in the shooting mode, the procedure proceeds to step S21. In step S21, an initial value Sinit (e.g., zero) is substituted in a variable Smax, and the procedure proceeds to step S5. In step 8, if no instruction to stop recording is found to have been entered ("No" in step S8), the procedure proceeds to step S22. Until an instruction to stop recording is entered, the loop of through the sequence of steps S22, S23, S13, and S24 and through steps S1, S2, S7 and S8 is executed repeatedly. This loop is gone through once every frame.

In step S22, whether or not the sound intensity value Sin of the current frame is greater than the variable Smax is checked. If the inequality Sin>Smax holds ("Yes" in step S22), the procedure proceeds to step 23; if not ("No" in step S22), the procedure returns to step S1. In step S23, the sound intensity value Sin of the current frame is substituted in the variable Smax, and the procedure proceeds to step S13. In step S13, a movie thumbnail is generated, and then the procedure proceeds to step S24. The operation performed in step S24 is the same as the operation performed in step S14 except that nothing is done with the flags F0 and F1. After step S24, the procedure returns to step S1.

Additional Conditions: Any additional condition may be combined with any of the first to fifth trigger conditions described above. Specifically, in that case, for example, if the k-th (where k represents an integer between 1 and 5) triggering condition described above is fulfilled, then only if an additional condition is also fulfilled, the procedure proceeds to step S12; even if the k-th triggering condition is fulfilled, unless the additional condition is fulfilled, the procedure proceeds to step S15.

For example, the first triggering condition described above may be combined with an additional condition that "the image shooting apparatus 1 is not being panned or tilted". Specifically, in that case, if "no change in angle of view has been made by zooming-in or zooming-out for a predetermined period T1 or longer after immediately previous zooming-in" and in addition if "the image shooting apparatus 1 is not being panned or tilted", then the procedure proceeds to step S12; otherwise, it proceeds to step S15.

This is because an image acquired without the image shooting apparatus 1 being panned or tilted, that is, one acquired with the image shooting apparatus 1 held in a fixed position, is supposed to more aptly show the subject the user is aiming at.

Panning denotes swinging the body (unillustrated) of the image shooting apparatus 1 side to side; tilting denotes swinging it up and down.

In terms of motion, the image shooting apparatus 1 (i.e., its body) is, roughly speaking, in one of the following four states: a stationary state in which the body of the image shooting apparatus 1 stands still; a hand-shake state in which the body of the image shooting apparatus 1 is vibrating finely in indefinite directions because of hand shake or the like; a panned state in which the image shooting apparatus 1 is being panned; and a tilted state in which the image shooting apparatus 1 is being tilted. Thus, put otherwise, the above-mentioned additional condition is that "the image shooting apparatus 1 is either in the stationary or hand-shake state".

When checking whether or not the additional condition is fulfilled, the CPU 23 functions as a detector for detecting which of the different motion states, namely the stationary, hand-shake, panned, and tilted states, the image shooting apparatus 1 is in.

For example, the CPU 23 makes the above check based on an output signal from an angular velocity sensor (gyro sensor, unillustrated) that detects the angular velocity of the body of the image shooting apparatus 1 and whose output thus represents the angular velocity, as is well known.

For example, suppose that, with respect to the panning direction, the output signal of the angular velocity sensor takes a positive value when the body of the image shooting apparatus 1 is swung leftward, takes a negative value when it is swung rightward, and equals zero when it is standing still. In this case, if the output signal of the angular velocity sensor equals zero or substantially zero, the stationary state is recognized; if the output signal of the angular velocity sensor vibrates finely between positive and negative values, the hand-shake state is recognized; if the output signal of the angular velocity sensor continues taking a positive or negative value for a predetermined period, the panned state is recognized. A similar check is made also in the tilting direction.

The motion state of the image shooting apparatus 1 may also be checked based on the result of the detection of motion in the image by the motion detection portion 44 shown in FIG. 3, as is well known. For example, the CPU 23 refers to the motion vectors VC1 to VC9 mentioned earlier in connection with the third check method. For example, if the motion vectors VC1 to VC9 keep pointing in the same direction (e.g., leftward) for a predetermined period or longer, the panned or tilted state is recognized; otherwise, the hand-shake or stationary state is recognized.

For example, an additional condition that "the image shooting apparatus 1 is not being panned or tilted" may be combined with the second triggering condition described above. Specifically, in that case, if "the width of variation of the position of the focus lens 31 has remained smaller than or equal to a predetermined threshold value for a predetermined period T2 or longer and in addition the image shooting apparatus 1 is not being panned or tilted", then the procedure proceeds to step S12; otherwise, it proceeds to step S15. Incidentally, when a far landscape is being shot, even in the panned state, the focus tends to be locked.

Modifications etc. to the First Embodiment

What triggering condition to adopt in step S11 may be chosen by the user. For example, the user may be allowed to choose which of the first to fifth triggering conditions described above to adopt in step S11. The choice is made, for example, through operation of the operated portion 26.

Of the first to fifth check methods described above, any two may be combined together. For example, the first and second check methods may be combined together. In that case, in step S11, whether or not the first and second triggering conditions are fulfilled is checked. If at least one of the first and second triggering conditions is fulfilled, the procedure proceeds to step S12; only if neither is fulfilled, the procedure proceeds to step S15. Alternatively, only if both of the first and second triggering conditions are fulfilled, the procedure proceeds to step S12; otherwise, the procedure proceeds to step S15.

The example described above deals with a case where a header file contains one movie thumbnail so that this one movie thumbnail is associated with one movie. Alternatively, a header file may contain a plurality of movie thumbnails so that these movie thumbnails are all associated with one movie. In that case, in step S14, the movie thumbnail existing in the header file is not replaced with the (latest) movie thumbnail generated in step S13, but the movie thumbnail generated in step S13 is added to the header file.

In a case where a plurality of movie thumbnails are associated with one movie, for example, when the cursor 72 shown in FIG. 5 is moved to the thumbnail image TN3, the different movie thumbnails are displayed one after another at predetermined time intervals in the area of the thumbnail image TN3.

In this connection, a movie thumbnail may itself be a movie (hereinafter called a thumbnail movie). Even a thumbnail sound may be generated based on the audio signal corresponding to a shot movie so that, when a thumbnail movie is displayed, its thumbnail sound is simultaneously played back from the loudspeaker 28. Even when a thumbnail image is a still image, a thumbnail sound may be outputted.

As described earlier, if the triggering condition is not fulfilled even once during shooting of a movie, the movie thumbnail generated in step S5 (the first thumbnail image candidate) eventually becomes the movie thumbnail associated with the movie. This movie thumbnail is generated based on the sensed-image signal at the timing that the movie starts to be shot (the video signal of the frame with which the movie starts to be shot or of the frame immediately before that).

What movie thumbnail to associate with a movie when the triggering condition is not fulfilled even once during its shooting is not limited to the one just described above. In such a case, the movie thumbnail has simply to be generated based on the sensed-image signal (of a frame) at prescribed timing; for example, it may be generated based on the sensed-image signal immediately before or after shooting of a movie, or the sensed-image signal of one of the frames of a movie being shot.

As described earlier, the contents of the memory card 18 can be freely read by an external personal computer or the like. The contents of the memory card 18 can be reproduced (displayed as images and outputted as sounds) on the display portion 27 and from the loudspeaker 28 as described above, but may also be reproduced with a personal computer or the like provided with a display and a loudspeaker.

In this embodiment, the part that functions as a view angle changing portion includes the driver 34. The view angle changing portion may be thought of as including also the operation keys 26c and/or the CPU 23 shown in FIG. 1, or the zoom lens 30 shown in FIG. 2. An autofocus control portion is realized mainly with the AF value detection portion 42 shown in FIG. 3, the CPU 23 shown in FIG. 1, and the driver 34 shown in FIG. 2.

In this embodiment, the thumbnail generating apparatus is built mainly with the thumbnail generation portion 45 (or the video signal processing portion 13 including it) and the CPU 23. The thumbnail generating apparatus may be thought of as including, in addition, one or more of the following: the view angle changing portion, the autofocus control portion, a motion detection portion (corresponding to the motion detection portion 44 shown in FIG. 3), a face area detection portion (corresponding to the face area detection portion 46 shown in FIG. 3), and a sound input portion (corresponding to the microphone 14 shown in FIG. 1). In step S5 shown in FIGS. 7 and 13, the thumbnail generation portion 45 functions as a first generating portion.

The first embodiment described above may incorporate any of the features of the second embodiment described later. Specifically, in step S11 shown in FIG. 7, whether or not "the shutter button 26b (see FIG. 1) has been pressed to request shooting of a still image" may be checked as a check of whether or not a sixth triggering condition is fulfilled. Then, if the sixth triggering condition is fulfilled, the procedure proceeds to step S12; if not, it proceeds to step S15.

Second Embodiment

Figure 15:
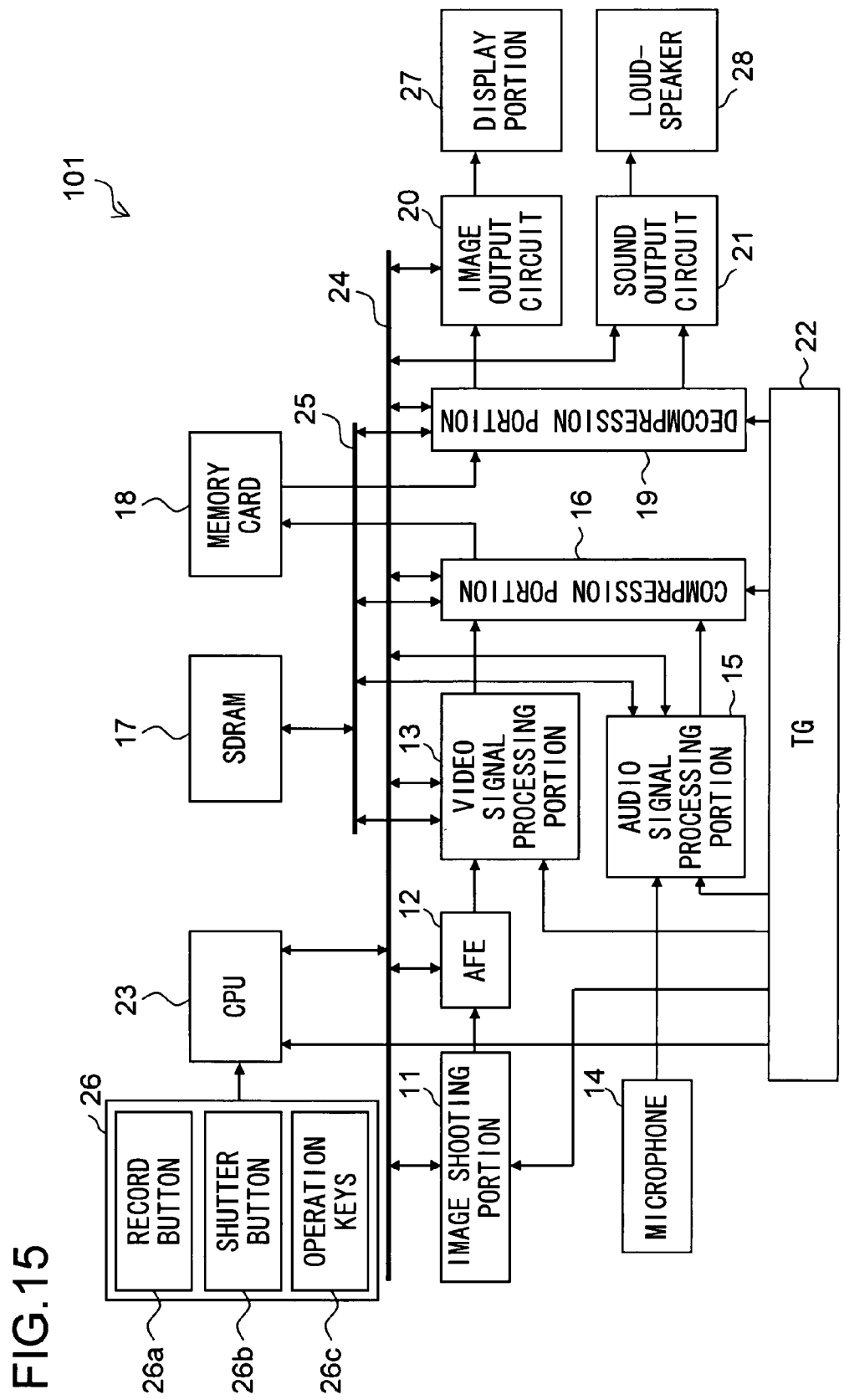
FIG. 15 is an overall block diagram of an image shooting apparatus according to a second embodiment of the invention.

Next, a second embodiment of the invention will be described. FIG. 15 is an overall block diagram of an image shooting apparatus 101 according to the second embodiment of the invention. The image shooting apparatus 101 is similar to the image shooting apparatus 1 shown in FIG. 1. The image shooting apparatus 101 differs from the image shooting apparatus 1 shown in FIG. 1 in that the video signal processing portion 13 shown in FIG. 1 is replaced with a video signal processing portion 113; in other respects, the image shooting apparatus 101 is quite like the image shooting apparatus 1. Accordingly, no overlapping description will be repeated, and the following description of the second embodiment is centered around the video signal processing portion 113.

The video signal processing portion 113 functions equivalently with the video signal processing portion 13; that is, based on the output signal of (the sensed-image signal from) the AFE 12, the video signal processing portion 113 generates the video signals of shot images, and feeds the video signals to the compression portion 16 and the image output circuit 20. The description of the video signal processing portion given earlier in connection with the first embodiment applies to the video signal processing portion 113. When any description of the first embodiment is applied to the second embodiment, the difference of the reference numerals 13 and 113 between those embodiments is to be ignored. The terms used in the description of the first embodiment apply in the second embodiment unless inconsistent. The drawings referred to in the description of the first embodiment are referred to in the description of this embodiment wherever necessary.

Figure 16:
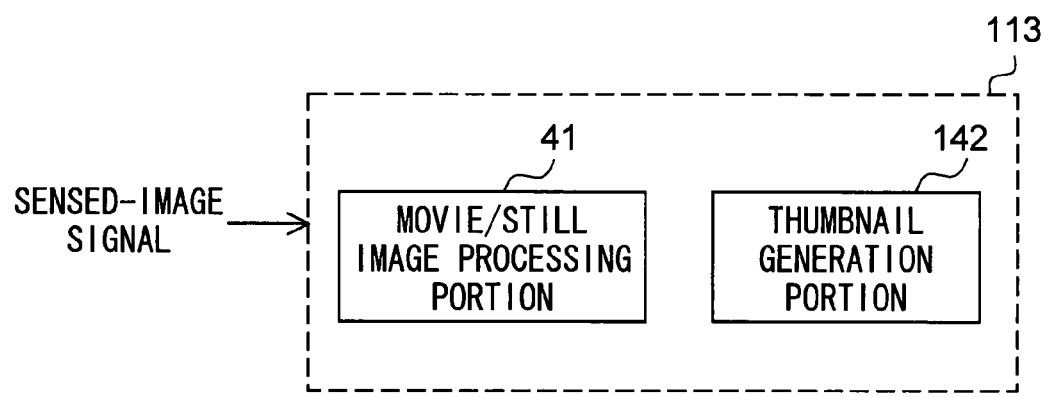
FIG. 16 is an internal block diagram of the video signal processing portion shown in FIG. 15.

FIG. 16 is an internal block diagram of the video signal processing portion 113. The video signal processing portion 113 includes a movie/still image processing portion 41 and a thumbnail generation portion 142.

The movie/still image processing portion 41 in the video signal processing portion 113 is the same as the one shown in FIG. 3. Although unillustrated in FIG. 16, the video signal processing portion 113 also includes an AF value detection portion 42, an AE value detection portion 43, a motion detection portion 44, etc. like those shown in FIG. 3. According to the AF evaluation value, the CPU 23 adjusts, via the driver 34 shown in FIG. 2, the position of the focus lens 31 so that an optical image of the subject is focused on the image sensing surface (light receiving surface) of the image sensing device 33. Moreover, according to the AE evaluation value, the CPU 23 adjusts, via the driver 34 shown in FIG. 2, the aperture of the aperture stop 32 (and also, where necessary, the amplification factor of the amplifier circuit in the AFE 12) in order to thereby control the amount of light received (the brightness of the image).

When a still image is shot, under the control of the CPU 23, the thumbnail generation portion 142 shown in FIG. 16 generates a thumbnail image of the still image based on the sensed-image signal at the timing that it is shot. More specifically, what the thumbnail generation portion 142 generates here is a video signal representing the thumbnail image, composed of a luminance signal Y and color difference signals U and V. This thumbnail image is a reduced image of a single still image (still picture) that has been shot and recorded, reduced, for example, through thinning-out. A thumbnail image of a shot still image (the video signal representing the thumbnail image) is, with association established between them, compressed by the compression portion 16 (e.g., in compliance with the JPEG standard) and recorded to the memory card 18. A thumbnail image associated with a shot still image is called a still-image thumbnail.

On the other hand, when a movie is shot, under the control of the CPU 23, the thumbnail generation portion 142 generates a thumbnail image of the movie based on the sensed-image signal at predetermined timing. More specifically, what the thumbnail generation portion 142 generates here is a video signal representing the thumbnail image, composed of a luminance signal Y and color difference signals U and V. At what timing this is done will be described in detail later. A thumbnail image of a shot movie is, with association established between them, compressed by the compression portion 16 (e.g., in compliance with the JPEG standard) and recorded to the memory card 18. A thumbnail image generated to be recorded in association with a shot movie is called a movie thumbnail. The size of a movie thumbnail is, through thinning-out or the like, reduced to be smaller than the size of the images constituting the movie (or smaller than the size of still images). This reduction of image size, however, is not essential.

In the thumbnail image display mode, movie thumbnails and still-image thumbnails stored in the memory card 18 are decompressed by the decompression portion 19 and then converted by the image output circuit 20 so as to be displayed on the display portion 27.

FIG. 5 shows an example of the screen displayed on the display portion 27 in the thumbnail image display mode. In FIG. 5, the display area on the display portion 27 is divided into four parts, with thumbnail images TN1, TN2, TN3, and TN4 displayed in the upper left, upper right, lower left, and lower right parts of the display area respectively. If more thumbnail images are stored in the memory card 18, operating the operation keys 26c in a predetermined way makes them appear on the screen. The thumbnail images TN2 and TN3 bear a mark 71 indicating that they are movie thumbnails. Thus, the thumbnail images TN2 and TN3 are movie thumbnails, while the thumbnail images TN1 and TN4 are still-image thumbnails.

As shown in FIG. 5, a cursor 72 appears on the screen. The cursor 72 moves across the screen as the operation keys 26c are operated. FIG. 5 shows a state in which the thumbnail image TN3 is being selected by the cursor 72. The number, such as "001", appearing in a lower right part of each thumbnail image is its file number.

When a thumbnail image is being selected by the cursor 72, operating the keys in a predetermined way causes the movie or still image associated with that thumbnail image to be read from the memory card 18. The movie or still image is then displayed over the entire screen on the display portion 27. For example, when the keys are so operated as to start the playback of the movie corresponding to the thumbnail image TN3, the screen on the display portion 27 changes from FIG. 5 to FIG. 6, and the movie corresponding to the thumbnail image TN3 is played back over the entire screen on the display portion 27. In this state, when the keys are so operated as to stop the playback, the screen returns to FIG. 5.

Now, how a movie thumbnail is generated will be described. Presented below are three examples of methods for generating a movie thumbnail. Unless otherwise stated, the following description of this embodiment focuses on a given single movie.

First Generation Method

Figure 17:
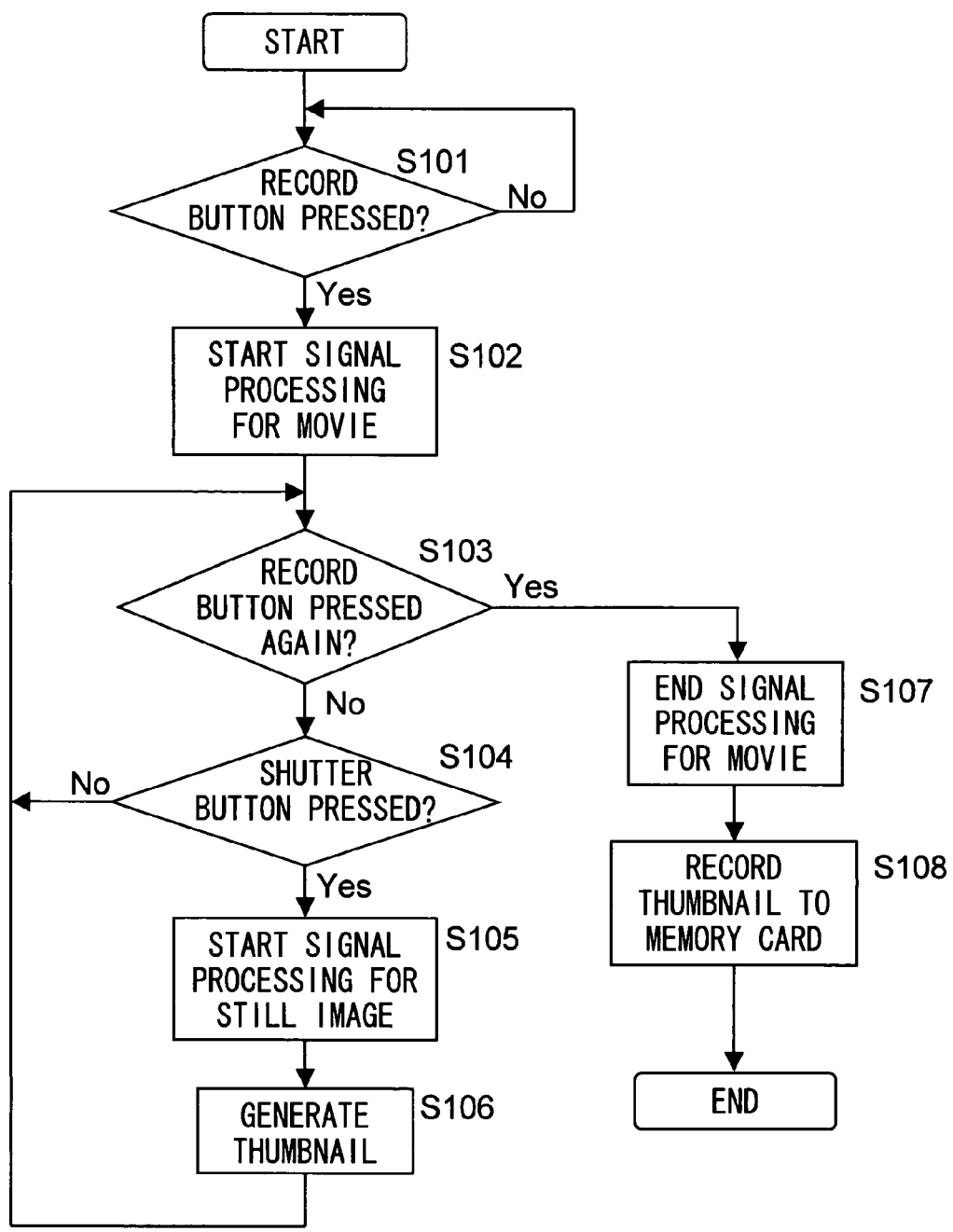
FIG. 17 is a flow chart showing the procedure for generating a movie thumbnail according to a first generation method in the second embodiment.

First, a first generation method will be described. FIG. 17 is a flow chart showing the procedure for generating a movie thumbnail according to the first generation method. The first generation method assumes that only one still image is shot during shooting of a movie.

First, in step S101, the CPU 23 checks whether or not the record button 26a has been pressed in the shooting mode. If not, the procedure repeats step S101; if so, the procedure proceeds to step S102 ("Yes" in step S101).

In step S102, signal processing for a movie is started (recording is started). Specifically, after the procedure has proceeded to step S102, until it proceeds to step S107 when the record button 26a is pressed again, under the CPU 23, the video signal representing the shot images of a series of frames (i.e., a movie) is, along with the corresponding audio signal, recorded sequentially via the compression portion 16 to the memory card 18.

After step S102, the procedure proceeds to step S103. In step S103, the CPU 23 checks whether or not the record button 26a has been pressed again, that is, whether or not an instruction to stop recording has been entered. If so, ("Yes" in step S103), the procedure proceeds to step S107; if not, ("No" in step S103), it proceeds to step S104.

In step S104, the CPU 23 checks whether or not the shutter button 26b has been pressed to enter an instruction to shoot a still image. If not ("No" in step S104), the procedure returns to step S103; if so ("Yes" in step S104), it proceeds to step S105.

In step S105, concurrently with the signal processing for the movie, signal processing for a still image is performed. Specifically, concurrently with the signal processing for the movie, under the control of the CPU 23, the movie/still image processing portion 41 generates a video signal representing a still image from the sensed-image signal of the current frame (hereinafter called the still-image frame). Then, in step S106, the thumbnail generation portion 142 generates a movie thumbnail from the sensed-image signal of the still-image frame. Thus, the movie thumbnail is a reduced (or original-size) image of the still image shot.

Steps S105 and S106 are executed concurrently. The video signal generated in step S105 and representing the still image is recorded via the compression portion 16 to the memory card 18. The video signal generated in step S106 and representing the movie thumbnail is temporarily recorded to the SDRAM 17. After step S106, the procedure returns to step S103.

In step S107, to which the procedure proceeds from the step S103 when an instruction to stop recording is entered, the signal processing for the movie is ended (recording is ended). That is, the recording to the memory card 18 of the video signal representing the shot images of a series of frames along with the corresponding audio signal, which has been performed since step S102, is stopped. Subsequently, in step S108, the movie thumbnail (the video signal representing the movie thumbnail) generated in step S106 is, with its association with the shot movie established, recorded to the memory card 18. On completion of step S108, the procedure shown in FIG. 17 ends.

During movie shooting, the user shoots a still image to record the subject in a special state. A still image shot during movie shooting is therefore thought of as an image with a special significance to the user. With the generation method under discussion, an image corresponding to a still image shot simultaneously while a movie is being shot is associated, as a movie thumbnail, with the movie, and this allows the movie thumbnail to be an image aptly representing the movie or an image impressive to the user. This facilitates retrieval of the desired movie, adding to the user's convenience. Moreover, to shoot a still image, the user has necessarily to operate the shutter button 26b. Thus, no extra operation or other burden is imposed on the user to select a movie thumbnail.

The example just presented deals with a typical case where a movie thumbnail is generated from the sensed-image signal of the still-image frame. Instead, a movie thumbnail may be generated from the sensed-image signal k frames before or after the still-image frame (where k is a prescribed natural number in the range from, e.g., one to several tens). In that case, the movie thumbnail generated in step S106 is a reduced (or original-size) image of the image shot k frames before or after the still image is shot. This applies also to the second and third generation methods described later. Even when the image from which a movie thumbnail is generated is not quite the same as the shot still image, it is possible to obtain the same effect as described above.

With the first generation method, and also with the second and third generation methods described later, if the shutter button 26b is not pressed even once during movie shooting, a reduced (or original-size) image of the image shot at prescribed timing is, as a movie thumbnail associated with the shot movie, recorded to the memory card 18. For example, a movie thumbnail is generated based on the image of the frame immediately before or after movie shooting, the image at the start or end of the movie, or the image of the frame a predetermined period after the start of movie shooting.

On the other hand, a still-image thumbnail is generated, for example, in step S106. The still-image thumbnail is then, in association with the still image generated in step S105, recorded via the compression portion 16 to the memory card 18. Typically, the movie thumbnail and the still-image thumbnail generated in step S106 are the same.

Second Generation Method

Figure 18:
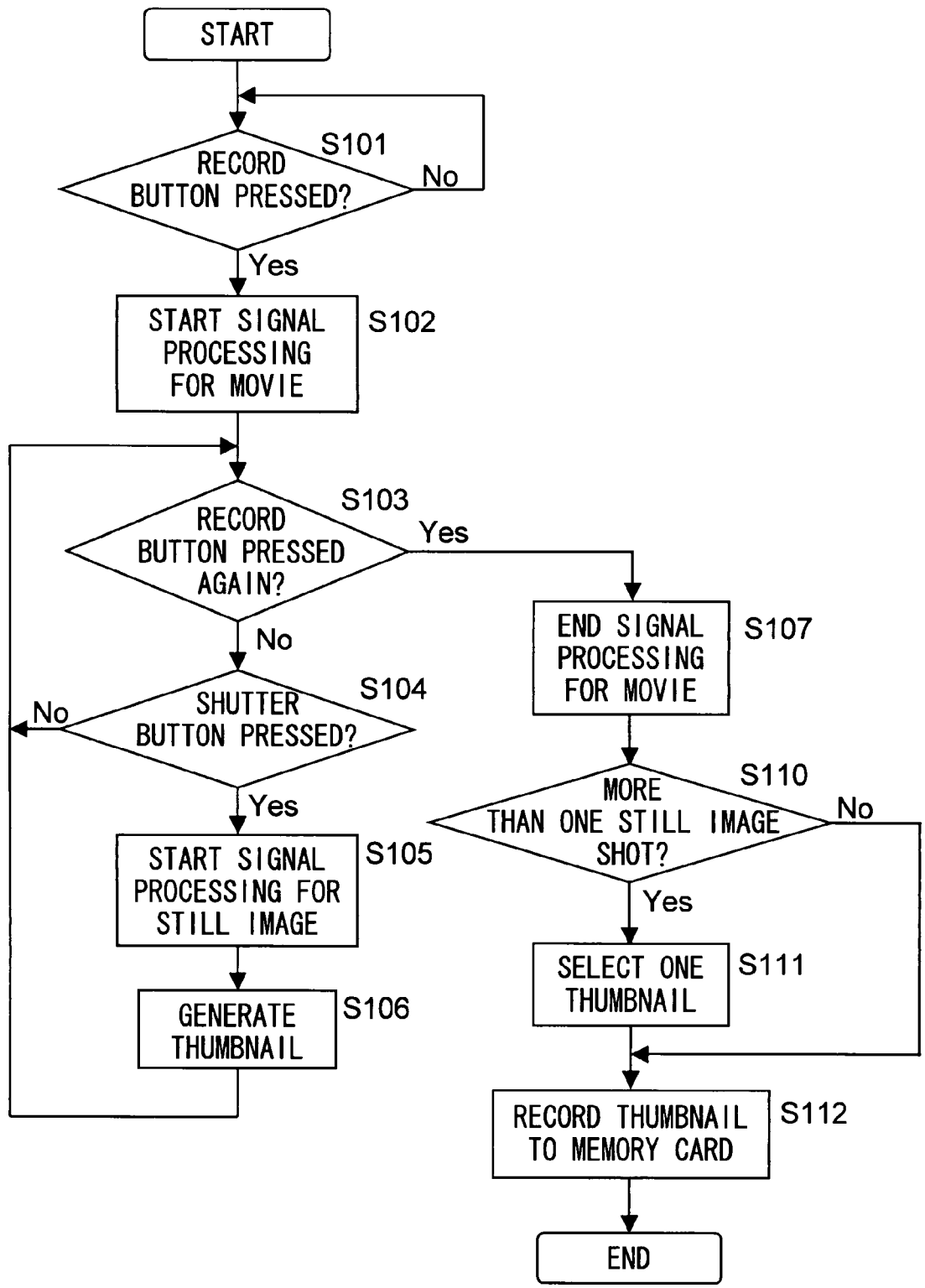
FIG. 18 is a flow chart showing the procedure for generating a movie thumbnail according to a second generation method in the second embodiment.

Next, a second generation method will be described. FIG. 18 is a flow chart showing the procedure for generating a movie thumbnail according to the second generation method.

The procedure according to the second generation method includes steps S101 to S107 and S110 to S112. The operations performed in steps S101 to S107 here is the same as those performed in the steps with the same step numbers in the first generation method (see FIG. 17), and therefore no overlapping description will be repeated.

The second generation method assumes that a plurality of still images are shot during shooting of a movie. To make the description specific, the following description deals mainly with a case where two still images are shot during movie shooting.

During movie shooting, when the shutter button 26b is pressed for the first time, then, in step S105, the video signal representing a first still image is generated, and the video signal is recorded to the memory card 18. Concurrently, in step S106, a first movie thumbnail is generated from the sensed-image signal of the frame (hereinafter called the first still-image frame) at which the first still image was shot.

Thereafter, while the movie continues to be shot, when the shutter button 26b is pressed for the second time, then, in step S105, the video signal representing a second still image is generated, and the video signal is recorded to the memory card 18. Concurrently, in step S106, a second movie thumbnail is generated from the sensed-image signal of the frame (hereinafter called the second still-image frame) at which the second still image was shot.

The first and second still-image frames are different, and the first and second movie thumbnails are different. The video signals representing the first and second movie thumbnails are temporarily recorded to the SDRAM 17. Likewise, in a case where n still images are shot during movie shooting, n movie thumbnails are generated (where n is an integer of 3 or greater).

In step S107, to which the procedure proceeds from the step S103 when an instruction to stop recording is entered, the signal processing for the movie is ended (recording is ended). In the second generation method, after step S107, the procedure proceeds to step S110. In step S110, whether or not a plurality of still images have been shot during movie shooting is checked. If only one still image has been shot during movie shooting ("No" in step S111), the procedure proceeds to step S112, where the same operation as that performed in step S108 in the first generation method is performed. Specifically, the movie thumbnail (the video signal representing the movie thumbnail) generated in step S106 is, with its association with the shot movie established, recorded to the memory card 18.

By contrast, if a plurality of still images have been shot as described above ("Yes" in step S110), the procedure proceeds from step S110 to step S111. In step S111, according to a predetermined rule, one of a plurality of movie thumbnails generated is selected. After the selection in step S111, the procedure proceeds to step S112, where the movie thumbnail (the video signal representing it) so selected in step S111 is, in association with the shot movie, recorded to the memory card 18. On completion of step S112, the procedure shown in FIG. 18 ends.

Four examples of methods for achieving the selection in step S111 will now be described one by one. The still image corresponding to the movie thumbnail selected in step S111 will be called the adopted still image. When the first still image mentioned above is the adopted still image, then, in step S111, the first movie thumbnail is selected to be associated with the movie. Actually, in step S111, the adopted still image is selected. This automatically decides which movie thumbnail to select in step S111.

As will be clear from the foregoing, the movie thumbnail selected in step S111 is generated based on the sensed-image signal at predetermined timing (of the still-image frame itself or a frame before or after it) relative to the timing (of the still-image frame) at which the adopted still image is shot.

The adopted still image is selected by a selection portion, which is realized mainly with the CPU 23 and the video signal processing portion 113.

First Selection Method: First, a first selection method will be described. In the first selection method, which one of a plurality of shot still images to select as the adopted still image is prescribed.

For example, the first or last one of the still images shot during shooting of a movie is selected as the adopted still image. For example, suppose that, during movie shooting, a first, a second, . . . , and an n-th (where n is an integer of 3 or greater) are shot in this order; then the first or n-th still image is selected as the adopted still image. Needless to say, any of the second to (n-1)th still image may instead be selected as the adopted still image.

Second Selection Method: Next, a second selection method will be described. In the second selection method, the degree of contrast of the image is referred to.

Figure 19:
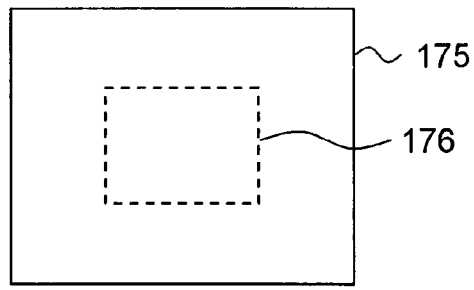
FIG. 19 is a diagram illustrating a second selection method applied to the second generation method in the second embodiment.

In FIG. 19, the entire area of the image obtained from a one-frame-worth sensed-image signal is indicated by 175, and a part of that area is indicated by 176. The part 176 is called a contrast detection area. The contrast detection area 176 is defined, for example, near the center of the entire area 175. In FIG. 19, the contrast detection area 176 is a single rectangular area; instead, it may is composed of a plurality of areas defined inside the entire area 175, or may be as large as the entire area 175 itself. The entire area 175 may be thought of as the entire image-sensing area of the image sensing device 33 shown in FIG. 2.

Figure 20:
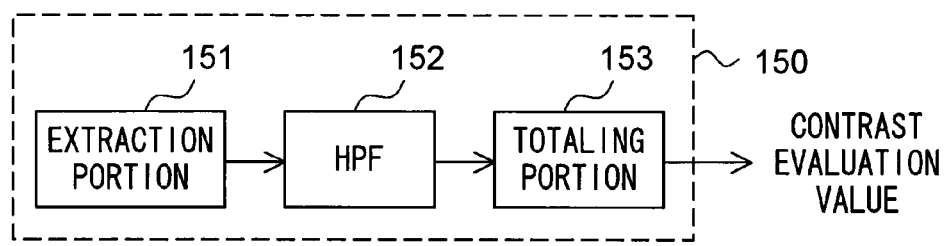
FIG. 20 is a diagram illustrating the second selection method applied to the second generation method in the second embodiment.

The contrast detection area 176 is defined for each of the still images shot during movie shooting. In a case where the second selection method is adopted, a contrast detection portion 150 as shown in FIG. 20 is used. The contrast detection portion 150 is provided within the video signal processing portion 113 shown in FIG. 15. The contrast detection portion 150 includes an extraction portion 151, a HPF (high-pass filter) 152, and a totaling portion 153.

The extraction portion 151 is fed with, as a signal representing a shot still image, the video signal generated by the movie/still image processing portion 41 or the sensed-image signal from the AFE 12. From this video signal or sensed-image signal, the extraction portion 151 extracts the luminance signal; here, it extracts only the luminance signal from within the contrast detection area 176. The HPF 152 extracts, from the luminance signal extracted by the extraction portion 151, only a predetermined high-frequency component. As is well known, the high-frequency component extracted here increases roughly in proportion to the degree of contrast within the contrast detection area 176 in the image.

The totaling portion 153 totalizes the high-frequency component extracted by the HPF 152 and thereby calculates a contrast evaluation value commensurate with the degree of contrast within the contrast detection area 176 in the image. The contrast evaluation value is calculated for each shot still image, and is fed to the CPU 23. The contrast evaluation value increases as the degree of contrast increases.

The CPU 23 compares the contrast evaluation values calculated for different still images; it then selects, as the adopted still image, the still image corresponding to the greatest contrast evaluation value, that is, the still image with the highest degree of contrast within the contrast detection area 176 in it, and accordingly decides which movie thumbnail to select in step S11.

When shooting is performed with a composition where the sky or the like occupies the background, the degree of contrast is usually higher if the subject, such as a person, is arranged to appear large than if it is arranged to appear small. Generally, an image shot with the former subject arrangement is more impressive to the user. Thus, adopting the second selection method helps obtain movie thumbnails that aptly represent movies or are impressive to the user. This facilitates retrieval of the desired movie, adding to the user's convenience.

Third Selection Method: Next, a third selection method will be described. The third selection method employs area division based on brightness information or color information.

Figure 21:
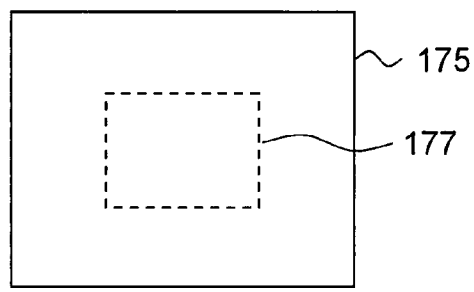
FIG. 21 is a diagram illustrating a third selection method applied to the second generation method in the second embodiment.

In FIG. 21, the entire area of the image obtained from a one-frame-worth sensed-image signal is indicated by 175, and a part of that area is indicated by 177. The part 177 is called a detection area. The detection area 177 is defined, for example, near the center of the entire area 175. The entire area 175 may be thought of as the entire image-sensing area of the image sensing device 33 shown in FIG. 2.

The detection area 177 is defined for each of the still images shot during movie shooting. Now, the procedure of the third selection method will be described with reference to the flow chart in FIG. 22.

First, attention is paid to one of a plurality of shot still images. In step S151, based on the sensed-image signal of the still-image frame, the detection area 177 is divided into a plurality of brightness regions or a plurality of color regions.

Figures 22, 23:
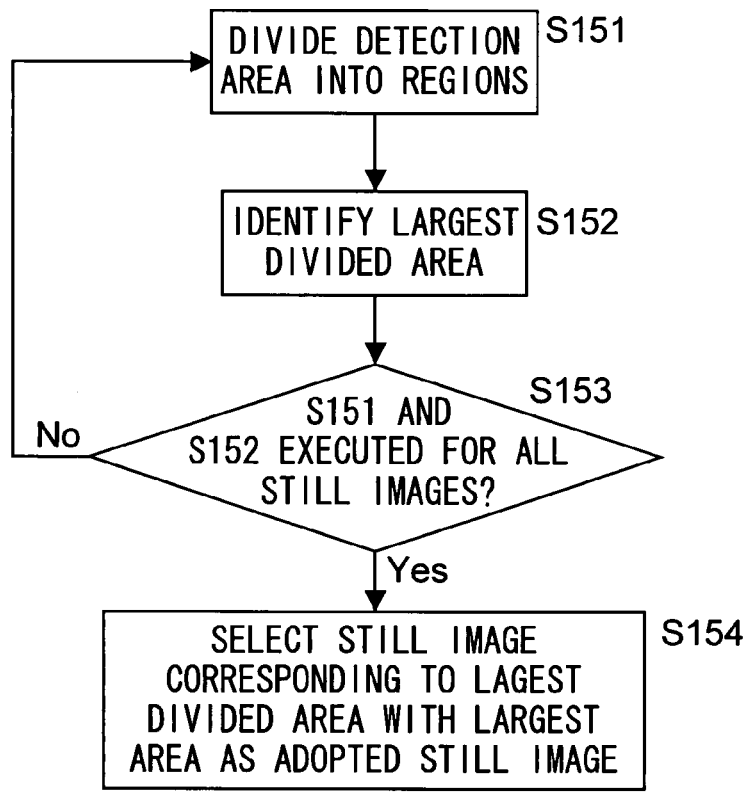
FIG. 22 is a flow chart illustrating the third selection method applied to the second generation method in the second embodiment.
FIG. 23 is a diagram illustrating the third selection method applied to the second generation method in the second embodiment.

The following description deals with a case where the detection area 177 is divided into a plurality of brightness regions. The brightness in different parts of the detection area 177 is identified based on the sensed-image signal from the pixels corresponding to the detection area 177. For each pixel, the luminance signal takes a value, for example, in the range from 0 to 255, which are here classified into a plurality of ranks, for example into nine brightness classes each covering 30 consecutive values. As shown in FIG. 23, pixels for which the value of the luminance signal is 0 to 30 are classified into brightness class 1; pixels for which the value of the luminance signal is 31 to 60 are classified into brightness class 2; . . . ; pixels for which the value of the luminance signal is 211 to 240 are classified into brightness class 8; and pixels for which the value of the luminance signal is 241 to 255 are classified into brightness class 9.

In a case where different luminance signal values are classified into nine brightness classes, the detection area 177 can be divided into nine brightness regions, namely a first, a second, . . . , and a ninth brightness region. The first, second, . . . , and ninth brightness regions are composed of pixels classified into brightness classes 1, 2, . . . , and 9 respectively. Thus, one brightness region is composed of pixels having similar brightness information. Depending on the sensed-image signal, the detection area 177 is divided into less than nine brightness regions; for example, when the image being shot is uniformly bright, the entire detection area 177 is occupied by a single brightness region.

After step S151, in step S152, the number of pixels forming each brightness region is counted to identify the largest brightness region (the one having the largest area, hereinafter called the largest divided area A). How large a brightness region is (its area) is proportional to the number of pixels forming it.

Steps S151 and S152 are executed for each shot still image, so that the largest divided area A is identified for each still image. In step S153, whether or not steps S151 and S152 have been executed for all still images is checked. When steps S151 and S152 have been executed for all still images, the procedure proceeds to step S154. In step S154, for example, the CPU 23 compares the largest divided areas A with one another. Then, according to the result of the comparison, the still image corresponding to, among all the largest divided areas A, the one with the largest area is selected as the adopted still image.

For example, if the largest divided area A for a first still image has an area of 10 pixels, and that for a second has an area of 15 pixels, then the second still image is selected as the adopted still image.

With similar operations, a case where the detection area 177 is divided into a plurality of color regions can be dealt with. Now, a description will be given of a case where the detection area 177 is divided into a plurality of color regions.

The color (hue) in different parts of the detection area 177 is identified based on the sensed-image signal from the pixels corresponding to the detection area 177. Based on this sensed-image signal, the color of each pixel is classified into one of a plurality of color classes, for example nine color classes, namely a first to a ninth color class.

In a case where the color of each pixel is classified into one of nine color classes, the detection area 177 is classified into nine color regions, namely a first, a second, . . . , and a ninth color region. The first, second, . . . , and ninth color regions are composed of pixels classified into color classes 1, 2, . . . , and 9 respectively. Thus, one color region is composed of pixels having similar color information. Depending on the sensed-image signal, the detection area 177 is divided into less than nine color regions; for example, when the image being shot is uniformly colored, the entire detection area 177 is occupied by a single color region.

In step S152, the number of pixels forming each color region is counted to identify the largest color region (the one having the largest area, hereinafter called the largest divided area B). How large a color region is (its area) is proportional to the number of pixels forming it.

Steps S151 and S152 are executed for each shot still image, so that the largest divided area B is identified for each still image. In step S1153, whether or not steps S151 and S152 have been executed for all still images is checked. When steps S151 and S152 have been executed for all still images, the procedure proceeds to step S154. In step S154, for example, the CPU 23 compares the largest divided areas B with one another. Then, according to the result of the comparison, the still image corresponding to, among all the largest divided areas B, the one with the largest area is selected as the adopted still image.

Figure 24A:
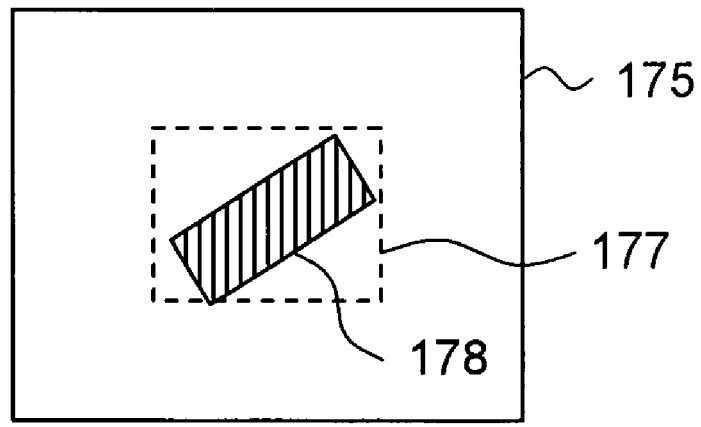
FIGS. 24A and 24B are diagrams illustrating the third selection method applied to the second generation method in the second embodiment.
Figure 24B:
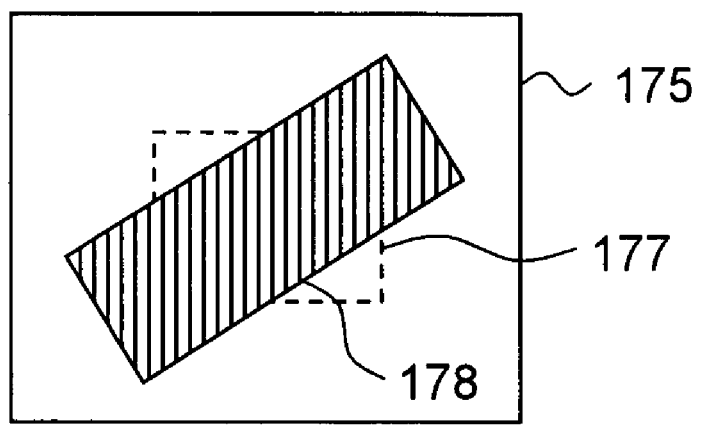

For example, compare a composition in which a green subject 178 is arranged to appear comparatively small in a white background as shown in FIG. 24A and a composition in which a green subject 178 is arranged to appear comparatively large in a white background as shown in FIG. 24B. In this case, the latter composition, in which the subject 178 appears larger, yields largest divided regions A and B with larger areas.

The user tends to shoot an image so that the subject occupies a large area on it, and an image so shot tends to be impressive to the user. Accordingly, adopting the third selection method helps obtain movie thumbnails that aptly represent movies or are impressive to the user. This facilitates retrieval of the desired movie, adding to the user's convenience.

The operation in step S151 (area division portion) is realized mainly by the CPU 23 or the video signal processing portion 113.

Fourth Selection Method: Next, a fourth selection method will be described. The fourth selection method pays attention to the intensity of the sound collected by the microphone 14 during shooting of a movie.

The audio signal processing portion 15 is capable of detecting the intensity or loudness of the sound, or of its frequency component in a predetermined band, collected by the microphone 14 during movie shooting. Based on the intensity or loudness of the sound, or of its frequency component in a predetermined band, the audio signal processing portion 15 calculates a sound intensity value for each shot still image. The following description deals with a case where the sound intensity value is commensurate with the intensity of sound, or of its frequency component in a predetermined band. In a case where the sound intensity value is commensurate with the loudness of sound, or of its frequency component in a predetermined band, the term "intensity" used in connection with sound in the following description is to be read as "loudness". Incidentally, the sound intensity value in this embodiment is to be understood as different from sound intensity value in the first embodiment.

The sound intensity value corresponding to a still image is the average value or peak value (maximum value) of the intensity of sound, or of its frequency component in a predetermined band, throughout the sound evaluation period corresponding to the still image. The sound evaluation period includes the period of the still-image frame; it may be the period of the still-image frame itself, or the period of a predetermined number of frames centered around the still-image frame.

The sound intensity value increases as the intensity of sound increases. The above-mentioned frequency component in a predetermined band is, for example, that in the frequency band of human voice or in the audible frequency band. To extract a frequency component in such a predetermined band from the audio signal fed from the microphone 14, the audio signal processing portion 15 uses a band-pass filter or the like.

The CPU 23 compares the sound intensity values calculated one for each of the still images shot during movie shooting, and selects, as the adopted still image, the still image corresponding to the greatest sound intensity value.

When a movie is being shot on the occasion of a concert or party, a condition where the intensity of sounds is high is supposed to correspond to a condition where the atmosphere is livened up. Thus, a still image corresponding to a great sound intensity value is supposed to be impressive to the user. Accordingly, adopting the fourth selection method helps obtain movie thumbnails that aptly represent movies or are impressive to the user. This facilitates retrieval of the desired movie, adding to the user's convenience.

Third Generation Method

Figure 25:
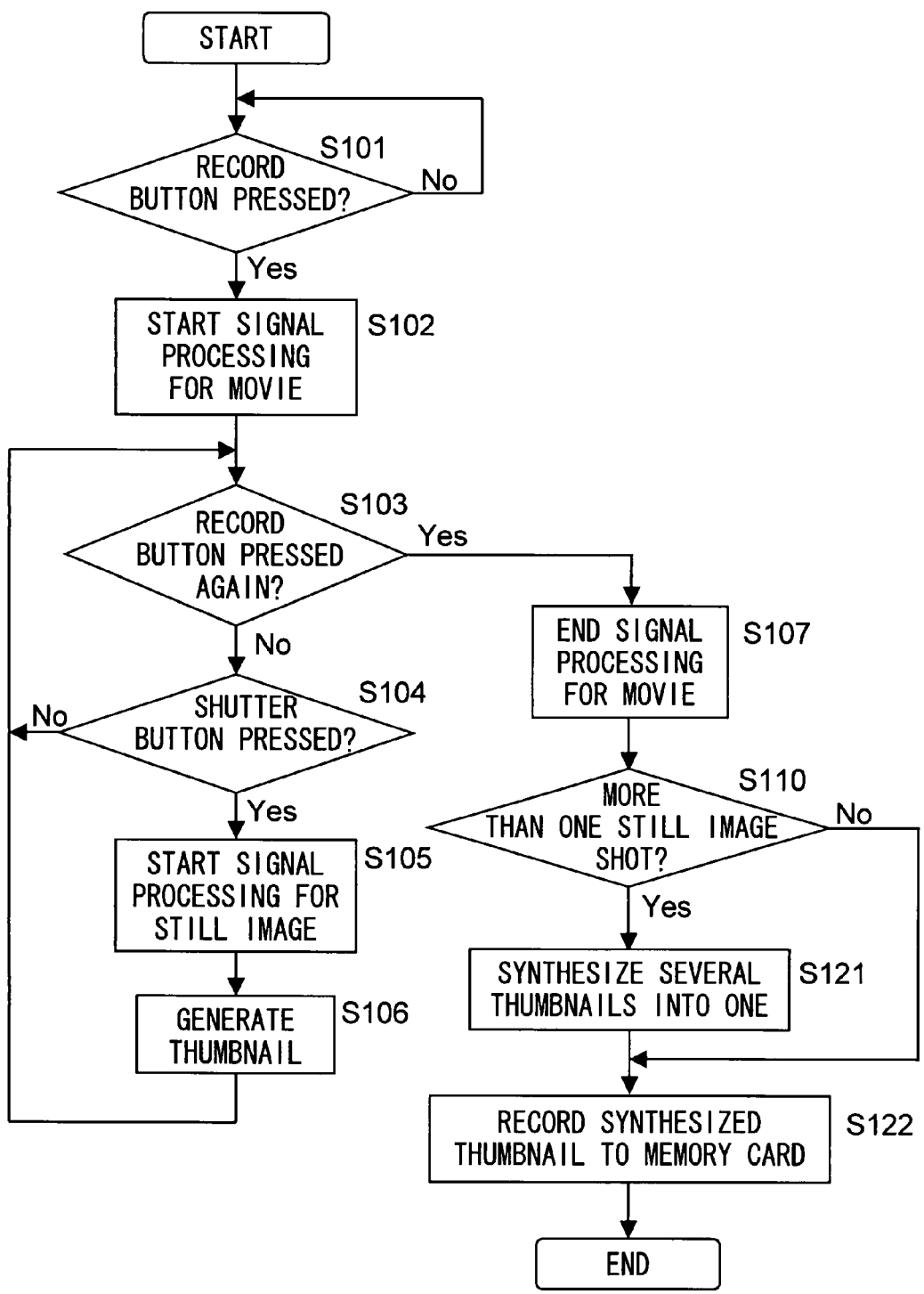
FIG. 25 is a flow chart showing the procedure for generating a movie thumbnail according to the third generation method in the second embodiment.

Next, a third generation method will be described. FIG. 25 is a flow chart showing the procedure for generating a movie thumbnail according to the third generation method.

The procedure according to the third generation method includes steps S101 to S107, S110, S121, and S122. The operations performed in steps S101 to S107 here is the same as those performed in the steps with the same step numbers in the first generation method (see FIG. 17), and the operation performed in step S110 is the same as that performed in the step with the same step number in the second generation method (see FIG. 18); therefore, no overlapping description will be repeated.

Like the second generation method, the third generation method assumes that a plurality of still images are shot during shooting of a movie.

The description of the second generation method has dealt with a case where first a first still image is shot at a first still-image frame and then a second still image is shot at a second still-image frame. The following description of the third generation method also assumes that a first and a second still image are shot in that way, and in addition assumes that, after the shooting of the second still image, a third still image is shot at a third still-image frame and further thereafter a fourth still image is shot at a fourth still-image frame.

In step S106, from the sensed-image signals of the first, second, third, and fourth still-image frames, a first, a second, a third, and a fourth movie thumbnail are generated. In this generation method, the movie thumbnails generated in step S106 are each a part of the movie thumbnail to be associated with a single movie. Accordingly, in this generation method, the first, second, third, and fourth movie thumbnails generated in steps S106 are called a first, a second, a third, and a fourth thumbnail element image.

As in the second generation method, in the third generation method, after step S107, the procedure proceeds to step S110. In step S110, whether or not a plurality of still images have been shot during movie shooting is checked. If only one still image has been shot during movie shooting ("No" in step S110), the procedure proceeds to step S122, where the same operation as that performed in step S108 in the first generation method is performed.

By contrast, if a plurality of still images have been shot as described above ("Yes" in step S110), the procedure proceeds from step S110 to step S121. In step S121, the four thumbnail element images generated in step S106 are synthesized together to generate a definitive movie thumbnail. After the synthesis in step S121, the procedure proceeds to step S122, where the movie thumbnail (the video signal representing it) resulting from the synthesis in step S121 is, in association with the shot movie, recorded to the memory card 18. On completion of step S122, the procedure shown in FIG. 25 ends.

Now, two examples of methods for the synthesis in step S121 will be described. In the generation method under discussion, the first to fourth still images are all adopted still images.

Figure 26:
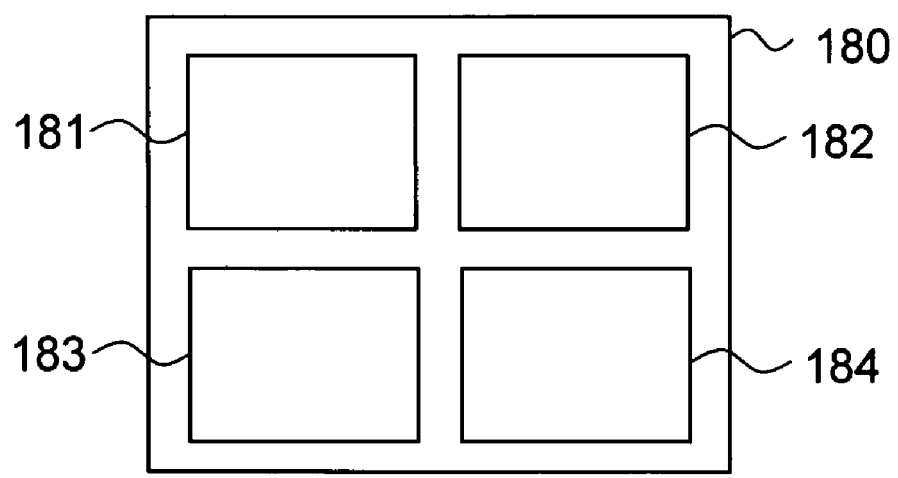
FIG. 26 is a diagram showing an example of a synthesized thumbnail image of a movie according to the third generation method in the second embodiment.

First Synthesis Method: First, a first synthesis method will be described. In FIG. 26, the movie thumbnail resulting from synthesis according to the first synthesis method is indicated by 180, and the first, second, third, and fourth thumbnail element image are indicated by 181, 182, 183, and 184 respectively. The size of the movie thumbnail 180 is, for example, the same as that of the thumbnail TN3 shown in FIG. 5. Thus, when the movie thumbnail 180 is created, the size of the individual thumbnail element images are appropriately reduced, for example, through thinning-out.

In a case where the first synthesis method is adopted, in the thumbnail image display mode, the movie thumbnail 180 is displayed, for example, in the position where the thumbnail TN3 is displayed.

In a case where five or more still images have been shot, four of them are selected as adopted still images, and a total of four thumbnail element images corresponding to them are synthesized together to generate a movie thumbnail. For example, the first four or last four still images are selected as adopted still images.

Second Synthesis Method: Next, a second synthesis method will be described. In a case where the second synthesis method is adopted, the movie thumbnail resulting from the synthesis in step S121 is composed of a plurality of images each the same size as the thumbnail TN3 shown in FIG. 5. In a case where a first to a fourth still image have been shot, the movie thumbnail resulting from the synthesis is composed of a first to a fourth thumbnail element image each the same size as the thumbnail TN3.

In a case where, during shooting of the movie corresponding to the thumbnail TN3, a first to a fourth still image are shot, when the thumbnail image display mode is selected, first, a first thumbnail element image is displayed in the position of the thumbnail TN3. A predetermined period (e.g., one second) thereafter, a second thumbnail element image is displayed in the position of the thumbnail TN3 in an updating fashion. Likewise, every time a predetermined period passes, the image displayed in the position of the thumbnail TN3 is updated with a third, and then a fourth thumbnail element image, and then the first thumbnail element again.

The above updating of the display may be performed only when the cursor 72 is at the thumbnail TN3, or irrespective of where the cursor 72 currently is.

Modifications etc. to the Second Embodiment

In the second embodiment, any feature of any one of the different generation methods (first to third generation methods) described above may be applied to any other of them unless inconsistent.

There is no restriction on the timing at which a movie thumbnail is actually generated. A movie thumbnail may be generated on receipt of a sensed-image signal from the AFE 12 during movie shooting. An image based on which to generate a movie thumbnail afterwards may be selected during movie shooting so that, based on that image, a movie thumbnail is generated later (e.g., when it is displayed on the display portion 27). Anyway, the sensed-image signal from which a given movie thumbnail is generated is the same.

As described earlier, the contents of the memory card 18 can be freely read by an external personal computer or the like. The contents of the memory card 18 can be reproduced (displayed as images and outputted as sounds) on the display portion 27 and from the loudspeaker 28 as described above, but may also be reproduced with a personal computer or the like provided with a display and a loudspeaker.

In the second embodiment, the thumbnail generating apparatus is built mainly with the thumbnail generation portion 142. The thumbnail generating apparatus may be thought of as including the CPU 23.

A movie thumbnail may itself be a movie (hereinafter called a thumbnail movie). Even a thumbnail sound may be generated based on the audio signal corresponding to a shot movie so that, when a thumbnail movie is displayed, its thumbnail sound is simultaneously played back from the loudspeaker 28. Even when a thumbnail image is a still image, a thumbnail sound may be outputted.

What is claimed is:

1. A thumbnail generating apparatus
that, based on a sensed-image signal representing a subject received from an image shooting portion provided in an image shooting apparatus capable of shooting a still image during shooting of a movie, generates a thumbnail image associated with the shot movie, and
that, when a still image is shot during shooting of the movie, generates the thumbnail image from the sensed-image signal at predetermined timing relative to when the still image is shot.

2. The thumbnail generating apparatus according to claim 1, wherein
the thumbnail image is generated from the sensed-image signal representing the still image.

3. The thumbnail generating apparatus according to claim 1, wherein
the thumbnail generating apparatus includes a selection portion that, when a plurality of still images are shot during shooting of the movie, selects one of the still images as an adopted still image, and
the thumbnail image is generated from the sensed-image signal at predetermined timing relative to when the adopted still image is shot.

4. The thumbnail generating apparatus according to claim 3, wherein
which of the still images to select as the adopted still image is prescribed.

5. The thumbnail generating apparatus according to claim 3, wherein
the thumbnail generating apparatus includes a contrast detection portion that defines a predetermined contrast detection area in each of the still images and that, based on the sensed-image signal representing the shot still images, detects a degree of contrast within the contrast detection area for each of the still images, and
the selection portion selects the adopted still image based on results of comparison of the degree of contrast among the still images.

6. The thumbnail generating apparatus according to claim 3, wherein
the thumbnail generating apparatus includes an area division portion that defines a predetermined detection area in each of the still images and that, based on the sensed-image signal representing the shot still images, divides, in each of the still images, the detection area into a plurality of brightness regions or a plurality of color regions, and
the selection portion identifies, in each of the still images, a brightness region or color region having a largest area among all the brightness regions or color regions, and selects the adopted still image based on results of comparison of an area of the brightness region or color region having the largest area among the still images.

7. The thumbnail generating apparatus according to claim 3, wherein
the image shooting apparatus includes a sound input portion that receives input of sound from outside,
the thumbnail generating apparatus includes a sound detection portion that detects, for each of the shot still images, intensity or loudness of the sound, or intensity or loudness of a frequency component of the sound in a predetermined band, corresponding to timing that the still image is shot, and
the selection portion selects the adopted still image based on results of comparison of the intensity or loudness of the sound or the intensity or loudness of the frequency component of the sound in the predetermined band among the still images.

8. The thumbnail generating apparatus according to claim 1, wherein
when a plurality of still images are shot during shooting of the movie, part or all of the still images are selected as adopted still images so that there are a plurality of adopted still images,
for each of the adopted still images, a thumbnail element image is generated from the sensed-image signal at predetermined timing relative to when the adopted still image is shot, and
the thumbnail image is generated by synthesizing together thumbnail element images of the adopted still images.

9. An image shooting apparatus capable of shooting a still image during shooting of a movie, comprising:
the image shooting portion and the thumbnail generating apparatus according to any one of claims 1 to 8.

* * * * *